United States Patent
Chandra et al.

(10) Patent No.: US 12,499,388 B2
(45) Date of Patent: Dec. 16, 2025

(54) METHOD AND SYSTEM FOR MULTI-SENSOR FUSION USING TRANSFORM LEARNING

(71) Applicants: Tata Consultancy Services Limited, Mumbai (IN); Indian Institute of Technology Kharagpur, West Bengal (IN)

(72) Inventors: Mariswamy Girish Chandra, Bangalore (IN); Achanna Anil Kumar, Bangalore (IN); Kriti Kumar, Bangalore (IN); Angshul Majumdar, Delhi (IN); Debasish Mishra, West Bengal (IN); Surjya Kanta Pal, West Bengal (IN)

(73) Assignees: Tata Consultancy Services Limited, Mumbai (IN); Indian Institute of Technology Kharagpur, West Bengal (IN)

( * ) Notice: Subject to any disclaimer, the term of this patent is extended or adjusted under 35 U.S.C. 154(b) by 1141 days.

(21) Appl. No.: 17/407,219

(22) Filed: Aug. 20, 2021

(65) Prior Publication Data
US 2022/0101205 A1    Mar. 31, 2022

(30) Foreign Application Priority Data
Aug. 21, 2020    (IN) .............................. 202021036163

(51) Int. Cl.
*G06N 20/20*    (2019.01)
*B23K 20/12*    (2006.01)
(Continued)

(52) U.S. Cl.
CPC .......... *G06N 20/20* (2019.01); *B23K 20/123* (2013.01); *G05B 23/0245* (2013.01); *G06F 17/16* (2013.01)

(58) Field of Classification Search
CPC .... G06N 20/20; B23K 20/123; B23K 20/122; B23K 20/12; G05B 23/0245; G06F 17/16
See application file for complete search history.

(56) References Cited

U.S. PATENT DOCUMENTS

2013/0097108 A1    4/2013    Niculescu-Mizil et al.

OTHER PUBLICATIONS

Hartl et al., "Predicting the Ultimate Tensile Strength of Friction Stir Welds Using Gaussian Process Regression" (Year: 2020).*
(Continued)

*Primary Examiner* — Kamran Afshar
*Assistant Examiner* — Kurt Nicholas Pressly
(74) *Attorney, Agent, or Firm* — Finnegan, Henderson, Farabow, Garrett & Dunner, LLP

(57) ABSTRACT

This disclosure relates to multi-sensor fusion using Transform Learning (TL) that provides a compact representation of data in many scenarios as compared to Dictionary Learning (DL) and Deep network models that may be computationally intensive and complex. A two-stage approach for better modeling of sensor data is provided, wherein in the first stage, representation of the individual sensor time series is learnt using dedicated transforms and their associated coefficients and in the second stage, all the representations are fused together using a fusing (common) transform and its associated coefficients to effectively capture correlation between the different sensor representations for deriving an inference. The method and system of the present disclosure can find application in areas employing multiple sensors that are mostly heterogeneous in nature.

16 Claims, 10 Drawing Sheets

(51) Int. Cl.
*G05B 23/02* (2006.01)
*G06F 17/16* (2006.01)

(56) References Cited

OTHER PUBLICATIONS

Zhang et al., "Multi-metric learning for multi-sensor fusion based classification" (Year: 2012).*
Kumar et al., "Transform Learning Based Function Approximation for Regression and Forecasting," (2015).
Xue et al., "DeepFusion: A Deep Learning Framework for the Fusion of Heterogeneous Sensory Data," (2019).
Zhang et al., "Multi-metric learning for multi-sensor fusion based classification," Information Fusion, 14:431-440 (2013).

* cited by examiner

METHOD AND SYSTEM FOR MULTI-SENSOR FUSION USING TRANSFORM LEARNING

PRIORITY CLAIM

This U.S. patent application claims priority under 35 U.S.C. § 119 to: Indian Patent Application No. 202021036163, filed on 21 Aug. 2020. The entire contents of the aforementioned application are incorporated herein by reference.

TECHNICAL FIELD

The disclosure herein generally relates to multi-sensor fusion, and, more particularly, to multi-sensor fusion using transform learning.

BACKGROUND

Multi-sensor fusion is a technique which combines sensory data from disparate sensors to obtain more useful information that may not be possible by a single sensor. The useful information thus obtained may be more accurate, complete or dependable 'view' of an entity or a system being sensed. This technique also offers several advantages associated with enhancing the data availability and authenticity with relatively lesser complexity. Often, multi-sensor fusion techniques encounter challenges related to data imperfection, diversity of sensing mechanism and nature of the application environment. Hence, depending on the nature of the problem and the available information from the sensors, various fusion architectures may be adopted. However, prevalent solutions for multi-sensor fusion are computationally complex and may not perform well in all scenarios.

SUMMARY

Embodiments of the present disclosure present technological improvements as solutions to one or more of the above-mentioned technical problems recognized by the inventors in conventional systems.

In an aspect, there is provided a processor implemented method comprising the steps of: receiving, via one or more hardware processors, a plurality of training data ($X_1$, $X_2$, ... $X_n$) from a plurality of sensors connected to a monitored system with a training output (y); performing, via the one or more hardware processors, a joint optimization of a set of parameters including (i) sensor specific transforms ($T_1$, $T_2$, ... $T_n$) and (ii) sensor specific coefficients ($Z_1$, $Z_2$, ... $Z_n$), wherein each of the sensor specific transforms and the sensor specific coefficients correspond to a training data in the plurality of training data ($X_1$, $X_2$, ... $X_n$), (iii) a fusing transform ($T^{(f)}$), (iv) a fusing coefficient ($Z^{(f)}$), and (v) a weight matrix (w) (304), and wherein the joint optimization comprises: initializing the sensor specific transforms ($T_1$, $T_2$, ... $T_n$) and the fusing transform ($T^{(f)}$) with a random matrix comprising real numbers between 0 and 1; estimating the sensor specific coefficients ($Z_1$, $Z_2$, ... $Z_n$) based on the initialized sensor specific transforms ($T_1$, $T_2$, $T_n$) and a corresponding training data from the plurality of training data ($X_1$, $X_2$, ... $X_n$); estimating the fusing coefficient ($Z^{(f)}$) based on the initialized fusing transform ($T^{(f)}$) and the estimated sensor specific coefficients ($Z_1$, $Z_2$, ... $Z_n$); estimating the weight matrix (w) based on the training output (y) and the estimated fusing coefficient ($Z^{(f)}$); and iteratively performing joint learning using the initialized parameters and the estimated parameters in a first iteration and learnt parameters thereafter until a termination criterion is met, the joint learning comprising: learning each of the sensor specific transforms ($T_1$, $T_2$, ... $T_n$) based on a corresponding sensor specific coefficient ($Z_1$, $Z_2$, ... $Z_n$) and the plurality of training data ($X_1$, $X_2$, ... $X_n$); learning each of the sensor specific coefficients ($Z_1$, $Z_2$, ... $Z_n$) based on the fusing transform ($T^{(f)}$), a corresponding sensor specific transform ($T_1$, $T_2$, ... $T_n$), the fusing coefficient ($Z^{(f)}$) and a corresponding training data from the plurality of training data ($X_1$, $X_2$, ... $X_n$), and remaining of the sensor specific coefficients ($Z_1$, $Z_2$, ... $Z_n$); learning the fusing transform ($T^{(f)}$) based on the sensor specific coefficient ($Z_1$, $Z_2$, ... $Z_n$) and the fusing coefficient ($Z^{(f)}$); learning the fusing coefficient ($Z^{(f)}$) based on the fusing transform ($T^{(f)}$), the sensor specific coefficient ($Z_1$, $Z_2$, ... $Z_n$), the weight matrix (w) and the training output (y); and learning the weight matrix (w) based on the fusing coefficient ($Z^{(f)}$) and the training output (y); wherein the termination criterion is one of (i) completion of a predefined number of iterations (Maxiter) and (ii) difference of the fusing transform ($T^{(f)}$) of a current iteration and the fusing transform ($T^{(f)}$) of a previous iteration being less than an empirically determined threshold value (Tol); to obtain jointly (i) the learnt sensor specific transforms ($T_1$, $T_2$, ... $T_n$), (ii) the learnt fusing transform ($T^{(f)}$) and (iii) the learnt weight matrix (w) for the monitored system being sensed by the plurality of sensors.

In another aspect, there is provided a system comprising: memory storing instructions; one or more communication interfaces; one or more hardware processors coupled to the memory via the one or more communication interfaces, wherein the one or more hardware processors are configured by the instructions to: receive a plurality of training data ($X_1$, $X_2$, ... $X_n$) from a plurality of sensors connected to a monitored system with a training output (y); perform a joint optimization of a set of parameters including (i) sensor specific transforms ($T_1$, $T_2$, ... $T_n$) and (ii) sensor specific coefficients ($Z_1$, $Z_2$, ... $Z_n$), wherein each of the sensor specific transforms and the sensor specific coefficients correspond to a training data in the plurality of training data ($X_1$, $X_2$, ... $X_n$), (iii) a fusing transform ($T^{(f)}$), (iv) a fusing coefficient ($Z^{(f)}$), and (v) a weight matrix (w), and wherein the joint optimization comprises: initializing the sensor specific transforms ($T_1$, $T_2$, ... $T_n$) and the fusing transform ($T^{(f)}$) with a random matrix comprising real numbers between 0 and 1; estimating the sensor specific coefficients ($Z_1$, $Z_2$, ... $Z_n$) based on the initialized sensor specific transforms ($T_1$, $T_2$, ... $T_n$) and a corresponding training data from the plurality of training data ($X_1$, $X_2$, ... $X_n$); estimating the fusing coefficient ($Z^{(f)}$) based on the initialized fusing transform ($T^{(f)}$) and the estimated sensor specific coefficients ($Z_1$, $Z_2$, ... $Z_n$); estimating the weight matrix (w) based on the training output (y) and the estimated fusing coefficient ($Z^{(f)}$); and iteratively performing joint learning using the initialized parameters and the estimated parameters from the set of parameters in a first iteration and learnt parameters thereafter until a termination criterion is met, the joint learning comprising: learning each of the sensor specific transforms ($T_1$, $T_2$, ... $T_n$) based on a corresponding sensor specific coefficient ($Z_1$, $Z_2$, ... $Z_n$) and the plurality of training data ($X_1$, $X_2$, ... $X_n$); learning each of the sensor specific coefficients ($Z_1$, $Z_2$, ... $Z_n$) based on the fusing transform ($T^{(f)}$), a corresponding sensor specific transform ($T_1$, $T_2$, ... $T_n$), the fusing coefficient ($Z^{(f)}$) and a corresponding training data from the plurality of training data ($X_1$, $X_2$, ... $X_n$), and remaining of the sensor specific coefficients ($Z_1$, $Z_2$, ... $Z_n$); learning the fusing transform ($T^{(f)}$) based on the sensor specific coefficient ($Z_1, Z_2, \ldots Z_n$) and the fusing coefficient ($Z^{(f)}$); learning the fusing coefficient ($Z^{(f)}$) based on the fusing transform ($T^{(f)}$), the sensor specific coefficient ($Z_1, Z_2, \ldots Z_n$), the weight matrix (w) and the training output (y); and learning the weight matrix (w) based on the fusing coefficient ($Z^{(f)}$) and the training output (y); wherein the termination criterion is one of (i) completion of a predefined number of iterations (Maxiter) and (ii) difference of the fusing transform ($T^{(f)}$) of a current iteration and the fusing transform ($T^{(f)}$) of a previous iteration being less than an empirically determined threshold value (Tol); to obtain jointly (i) the learnt sensor specific transforms ($T_1, T_2, \ldots T_n$), (ii) the learnt fusing transform ($T^{(f)}$) and (iii) the learnt weight matrix (w) for the monitored system being sensed by the plurality of sensors.

In yet another aspect, there is provided a computer program product comprising a non-transitory computer readable medium having a computer readable program embodied therein, wherein the computer readable program, when executed on a computing device, causes the computing device to: receive a plurality of training data ($X_1, X_2, \ldots X_n$) from a plurality of sensors connected to a monitored system with a training output (y); perform a joint optimization of a set of parameters including (i) sensor specific transforms ($T_1, T_2, \ldots T_n$) and (ii) sensor specific coefficients ($Z_1, Z_2, \ldots Z_n$), wherein each of the sensor specific transforms and the sensor specific coefficients correspond to a training data in the plurality of training data ($X_1, X_2, \ldots X_n$), (iii) a fusing transform ($T^{(f)}$), (iv) a fusing coefficient ($Z^{(f)}$), and (v) a weight matrix (w), and wherein the joint optimization comprises: initializing the sensor specific transforms ($T_1, T_2, \ldots T_n$) and the fusing transform ($T^{(f)}$) with a random matrix comprising real numbers between 0 and 1; estimating the sensor specific coefficients ($Z_1, Z_2, \ldots Z_n$) based on the initialized sensor specific transforms ($T_1, T_2, \ldots T_n$) and a corresponding training data from the plurality of training data ($X_1, X_2, \ldots X_n$); estimating the fusing coefficient ($Z^{(f)}$) based on the initialized fusing transform ($T^{(f)}$) and the estimated sensor specific coefficients ($Z_1, Z_2, \ldots Z_n$); estimating the weight matrix (w) based on the training output (y) and the estimated fusing coefficient ($Z^{(f)}$); and iteratively performing joint learning using the initialized parameters and the estimated parameters from the set of parameters in a first iteration and learnt parameters thereafter until a termination criterion is met, the joint learning comprising: learning each of the sensor specific transforms ($T_1, T_2, \ldots T_n$) based on a corresponding sensor specific coefficient ($Z_1, Z_2, \ldots Z_n$) and the plurality of training data ($X_1, X_2, \ldots X_n$); learning each of the sensor specific coefficients ($Z_1, Z_2, \ldots Z_n$) based on the fusing transform ($T^{(f)}$), a corresponding sensor specific transform ($T_1, T_2, \ldots T_n$), the fusing coefficient ($Z^{(f)}$) and a corresponding training data from the plurality of training data ($X_1, X_2, \ldots X_n$), and remaining of the sensor specific coefficients ($Z_1, Z_2, \ldots Z_n$); learning the fusing transform ($T^{(f)}$) based on the sensor specific coefficient ($Z_1, Z_2, \ldots Z_n$) and the fusing coefficient ($Z^{(f)}$); learning the fusing coefficient ($Z^{(f)}$) based on the fusing transform ($T^{(f)}$), the sensor specific coefficient ($Z_1, Z_2, \ldots Z_n$), the weight matrix (w) and the training output (y); and learning the weight matrix (w) based on the fusing coefficient ($Z^{(f)}$) and the training output (y); wherein the termination criterion is one of (i) completion of a predefined number of iterations (Maxiter) and (ii) difference of the fusing transform ($T^{(f)}$) of a current iteration and the fusing transform ($T^{(f)}$) of a previous iteration being less than an empirically determined threshold value (Tol); to obtain jointly (i) the learnt sensor specific transforms ($T_1, T_2, \ldots T_n$), (ii) the learnt fusing transform ($T^{(f)}$) and (iii) the learnt weight matrix (w) for the monitored system being sensed by the plurality of sensors.

In accordance with an embodiment of the present disclosure, herein the joint optimization is represented as $$\min_{T_1,T_2,\ldots T_n^{(f)}, Z_1, Z_2,\ldots Z_n, Z^{(f)}, w} \|T_1 X_1 - Z_1\|_F^2 +$$
$$\|T_2 X_2 - Z_2\|_F^2 + \ldots + \|T_n X_n - Z_n\|_F^2 + \lambda_1(\|T_1\|_F^2 - \log\det T_1) +$$
$$\lambda_2(\|T_2\|_F^2 - \log\det T_2) + \ldots + \lambda_n(\|T_n\|_F^2 - \log\det T_n) +$$
$$\gamma \left\| T^{(f)} \begin{bmatrix} Z_1 \\ Z_2 \\ \vdots \\ Z_n \end{bmatrix} - Z^{(f)} \right\|_F^2 + \lambda(\|T^{(f)}\|_F^2 - \log\det T^{(f)}) + \alpha \|y - w Z^{(f)}\|_2^2,$$

and wherein $T_1 \in \mathbb{R}^{K_1 \times m_1}$, $T_2 \in \mathbb{R}^{K_2 \times m_2}$, $T_n \in \mathbb{R}^{K_n \times m_n}$ are the sensor specific transforms, $T^{(f)} \in \mathbb{R}^{K \times (K_1+K_2+\ldots K_n)}$ is the fusing transform, $Z_1 \in \mathbb{R}^{K_1 \times N}$, $Z_2 \in \mathbb{R}^{K_2 \times N}$, $Z_n \in \mathbb{R}^{K_n \times N}$ are the sensor specific coefficients, $Z^{(f)} \in \mathbb{R}^{K \times N}$ is the fusing coefficient and $w \in \mathbb{R}^{1 \times K}$ is the weight matrix provided the training output $y \in \mathbb{R}^{1 \times N}$, K being the size of the sensor specific transforms and the fusing transform and N being the number of measurements in the training data.

In accordance with an embodiment of the present disclosure, wherein the learning of each of the sensor specific coefficients ($Z_1, Z_2, \ldots Z_n$) is represented as $$Z_j = (\gamma T_j^{(f)T} T_j^{(f)} + 1)^{-1} \cdot (T_j X_j + \gamma (T_j^{(f)T}(Z^{(f)} - \Sigma_{i=1, i \neq j}^n T_i^{(f)} Z_i)))$$
for $j = 1, \ldots, n$.

In accordance with an embodiment of the present disclosure, wherein the learning of the fusing coefficient $Z^{(f)}$ is represented as $$Z^{(f)} = (I - \alpha w^T w)^{-1} \cdot (T^{(f)} Z' + \alpha w^T y), \text{ wherein } Z' = \begin{bmatrix} Z_1 \\ Z_2 \\ \vdots \\ Z_n \end{bmatrix}.$$

In accordance with an embodiment of the present disclosure, wherein the learning of the weight matrix (w) is represented as $$w \leftarrow \min_w \alpha \|y - w Z^{(f)}\|_2^2.$$

In accordance with an embodiment of the present disclosure, wherein the one or more processors are further configured to estimate an output ($y_{new}$) of the monitored system for a plurality of new data ($x_1, x_2, \ldots x_n$) by: receiving, via the one or more hardware processors, the plurality of new data ($x_1, x_2, \ldots x_n$) from the plurality of sensors connected to the monitored system; estimating the sensor specific coefficients ($z_1, z_2, \ldots z_n$) corresponding to the plurality of new data ($x_1, x_2, \ldots x_n$) using the plurality of new data ($x_1, x_2, \ldots x_n$) and the learnt sensor specific transforms ($T_1, T_2, \ldots T_n$); estimating a new fusing coefficient $z^{(f)}$ using the learnt fusing transform ($T^{(f)}$) and the estimated sensor specific coefficients ($z_1, z_2, \ldots z_n$); and estimating the output ($y_{new}$) for the monitored system based on the learnt weight matrix (w) and the estimated new fusing coefficient $z^{(f)}$.

In accordance with an embodiment of the present disclosure, wherein the plurality of training data $(X_1, X_2, \ldots X_n)$ and the plurality of new data $(x_1, x_2, \ldots x_n)$ are kernelized using a kernel function.

In accordance with an embodiment of the present disclosure, wherein the monitored system is a Friction Stir Welding (FSW) machine, the plurality of sensors include sensors configured to capture the new data pertaining to force, torque and power for a welding process implemented by the FSW machine, the output (y) is a value representing Ultimate Tensile Strength (UTS) indicative of the quality of the weld performed by the FSW machine.

In accordance with an embodiment of the present disclosure, wherein estimating the sensor specific coefficients $(z_1, z_2, \ldots z_n)$ corresponding to the plurality of new data $(x_1, x_2, \ldots x_n)$ is represented as $z_j = T_j x_j$, for $j=1, \ldots, n$; wherein estimating the new fusing coefficient $z^{(f)}$ is represented as $$z^{(f)} = T^{(f)} \begin{bmatrix} z_1 \\ z_2 \\ \vdots \\ z_n \end{bmatrix};$$

and wherein estimating the output $(y_{new})$ for the monitored system is represented as $y_{new} = w z^{(f)}$.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
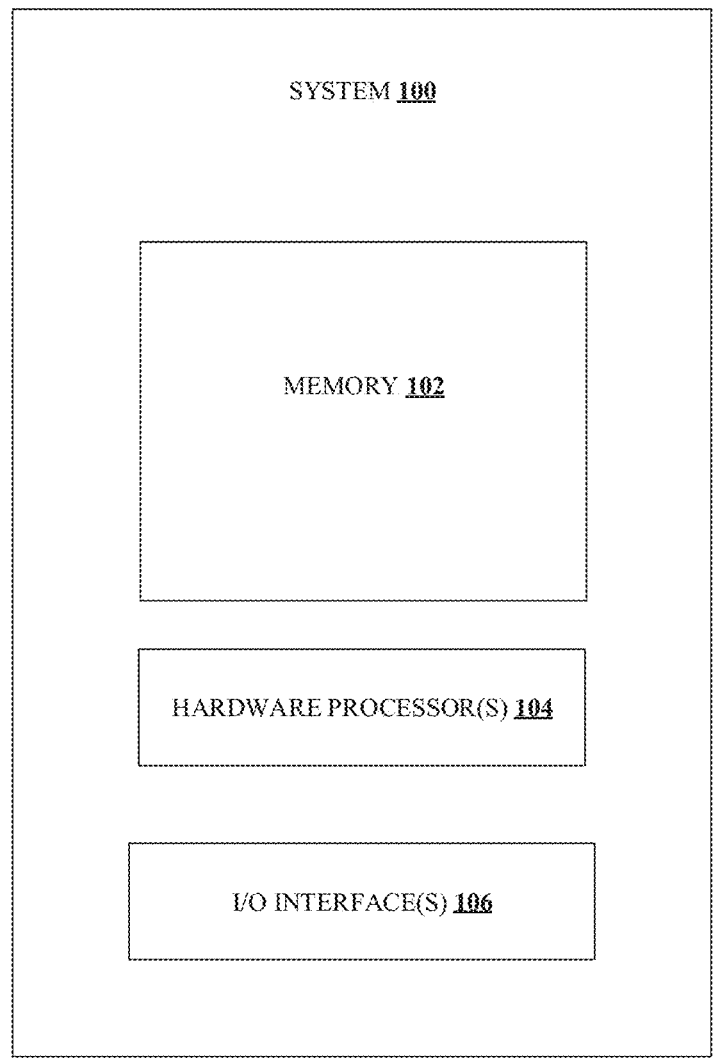
FIG. 1 illustrates an exemplary block diagram of a system for multi-sensor fusion using Transform Learning, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

Solutions for multi-sensor fusion may be broadly classified into three levels: Data-level, Feature-level and Decision-level. Alternative to the classical hand-crafted feature design-based approach, learning representations directly from data streams is gaining popularity. The data-driven representations may be learnt by employing representation learning techniques. There has been some work on multi-sensor fusion at raw data level. Fusion at feature level has also been utilized in the art, wherein an output from different sensor signal pipelines, processed individually by deep learning, are fused by a fully connected layer for time series classification. Deep network models are computationally intensive and complex. In contrast, Dictionary Learning (DL), Transform Learning (TL) provide compact representation of data in many scenarios and may perform well in different application domains. Several studies have shown that between DL and TL techniques, TL based approach performs better in many scenarios with relatively lesser computational complexity. DL has been explored for multi-sensor fusion.

In a previous patent application (Application No. 201921035106 filed on 30 Aug. 2019), the Applicant has disclosed a basic TL for Regression (TLR) approach and a Kernel TL for Regression (KTLR) approach for learning non-linear relationship in received data. In the present disclosure, Applicant leverages advantages of the TL approach for multi-sensor fusion, wherein the input data may be multi-modal since the sensors may be heterogeneous. The Applicant's Application No. 201921035106 provided a single stage approach, wherein a single representation in terms of transform and coefficient is learnt for the received data. In the present disclosure, a two-stage approach is employed for better modeling of the sensor data, wherein in the first stage, representation of the individual sensor time series is learnt using dedicated transforms and their associated coefficients and in the second stage, all the representations are fused together using a fusing (common) transform and its associated coefficients to effectively capture correlation between the different sensor representations for deriving an inference. Formulations of both non-kernel and kernelized versions i.e., Transform Learning for Fusion (TLF) and the Kernel Transform Learning for Fusion (KTLF) are addressed in the present disclosure. Applicant has further evaluated performance of the method and system of the present disclosure in comparison with standard DL techniques for regression (where a single transform or dictionary is learnt for an entire multi-variate data) and also with the TLR and KTLR techniques of the Applicant's Application No. 201921035106.

A brief description of TL and its kernel variant KTL as known in the art is provided below.

Basic Transform Learning Framework (TL): The relationship between a data matrix $X \in \mathbb{R}^{m \times N}$, the transform $T \in \mathbb{R}^{K \times m}$ and corresponding sparse coefficients $Z \in \mathbb{R}^{K \times N}$ may be expressed as $$TX = Z \quad \rightarrow (1)$$

wherein m is the number of features of length N of the raw input data matrix X and K is the number of atoms (size) of the transform T.

Given X, the appropriate transform matrix T and sparse coefficients Z is learnt by solving the following optimization problem:

$$\min_{T,Z} \|TX - Z\|_F^2 + \lambda(\|T\|_F^2 - \log\det T) + \mu \|Z\|_0) \quad (2)$$

wherein the additional regularization term $\|T\|_F^2 - \log\det T$ prevents trivial solution by controlling the condition number of the transform matrix T and $\|Z\|_0$ enforces sparsity on the learnt coefficient Z. The above minimization equation (2) is solved for T and Z employing an alternative minimization framework. Z is updated using the following steps:

$$Z \leftarrow \min_Z \|TX - Z\|_F^2 + \mu \|Z\|_0 \quad (3)$$

$$Z = (\text{abs}(TX) \geq \mu) \cdot TX \quad (4)$$

wherein the term in the bracket is hard thresholded against a threshold $\mu$ and '·' denotes element-wise product.
On the other hand, T is updated as:

$$T \leftarrow \min_T \|TX - Z\|_F^2 + \lambda(\|T\|_F^2 - \log\det T) \quad (5)$$

Cholesky decomposition is used for solving this. It is expressed as:

$$XX^T + \lambda I = LL^T \quad \rightarrow (6)$$

wherein L is a lower triangular matrix and $L^T$ denotes the conjugate transpose of L. Singular value decomposition is applied which results in:

$$L^{-1}XZ^T = USV^T \quad \rightarrow (7)$$

wherein the diagonal entries of S are the singular values and U and V are the left and right singular vectors of $L^{-1}XZ^T$ respectively. Using the above, the final T update is given as:

$$T = 0.5V(S + (S^2 + 2\lambda I)^{1/2})U^T L^{-1} \quad \rightarrow (8)$$

The transform thus learnt may be used to carry out classification or regression tasks depending on whether an associated output is discrete or continuous.

Kernel Transform Learning Framework (KTL): To capture the non-linearities in the data, KTL may be employed as:

$$B\mathcal{K}(X,X) = Z \quad \rightarrow (9)$$

wherein B is the transform and $\mathcal{K}(X,X)$ is the kernel matrix which may be defined upfront unlike in dictionary-based methods and is express as:

$$\mathcal{K}(X,X) = \varphi(X)^T \varphi(X) \quad \rightarrow (10)$$

The complete formulation of KTL by imposing sparsity on the Z may be expressed as:

$$\min_{B,Z} \|B\mathcal{K}(X,X) - Z\|_F^2 + \lambda(\|B\|_F^2 - \log\det B) + \mu \|Z\|_0) \quad (11)$$

The closed form solution updates for B and Z in KTL is identical to the TL with the only difference being that the kernelized version of the data $\mathcal{K}(X,X)$ is utilized instead of the raw input data X.

Referring now to the drawings, and more particularly to FIG. 1 through FIG. 5B, where similar reference characters denote corresponding features consistently throughout the figures, there are shown preferred embodiments and these embodiments are described in the context of the following exemplary system and/or method.

FIG. 1 illustrates an exemplary block diagram of a system 100 for multi-sensor fusion using Transform Learning (TL), in accordance with some embodiments of the present disclosure. In an embodiment, the system 100 for multi-sensor fusion includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system for multi-sensor fusion 100 can be implemented in a variety of computing systems, such as laptop computers, notebooks, hand-held devices, workstations, mainframe computers, servers, a network cloud and the like.

I/O interface(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the 1/O interface(s) can include one or more ports for connecting a number of devices to one another or to another server.

The memory 102 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, one or more modules (not shown) of the system for multi-sensor fusion 100 can be stored in the memory 102.

Figure 2:
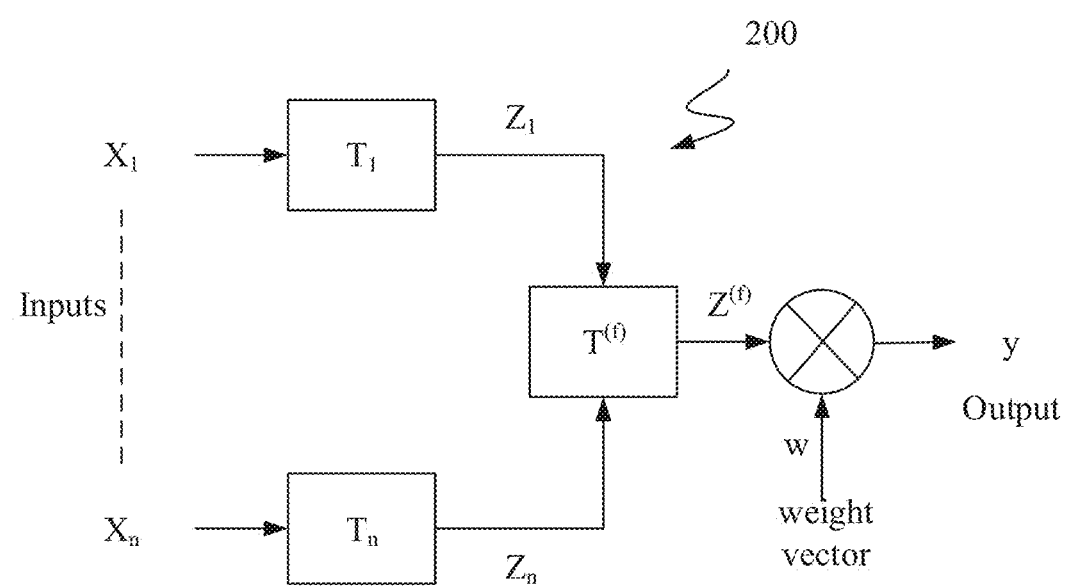
FIG. 2 is a high-level flow diagram of a method for multi-sensor fusion using Transform Learning according to some embodiments of the present disclosure.
Figure 3A:
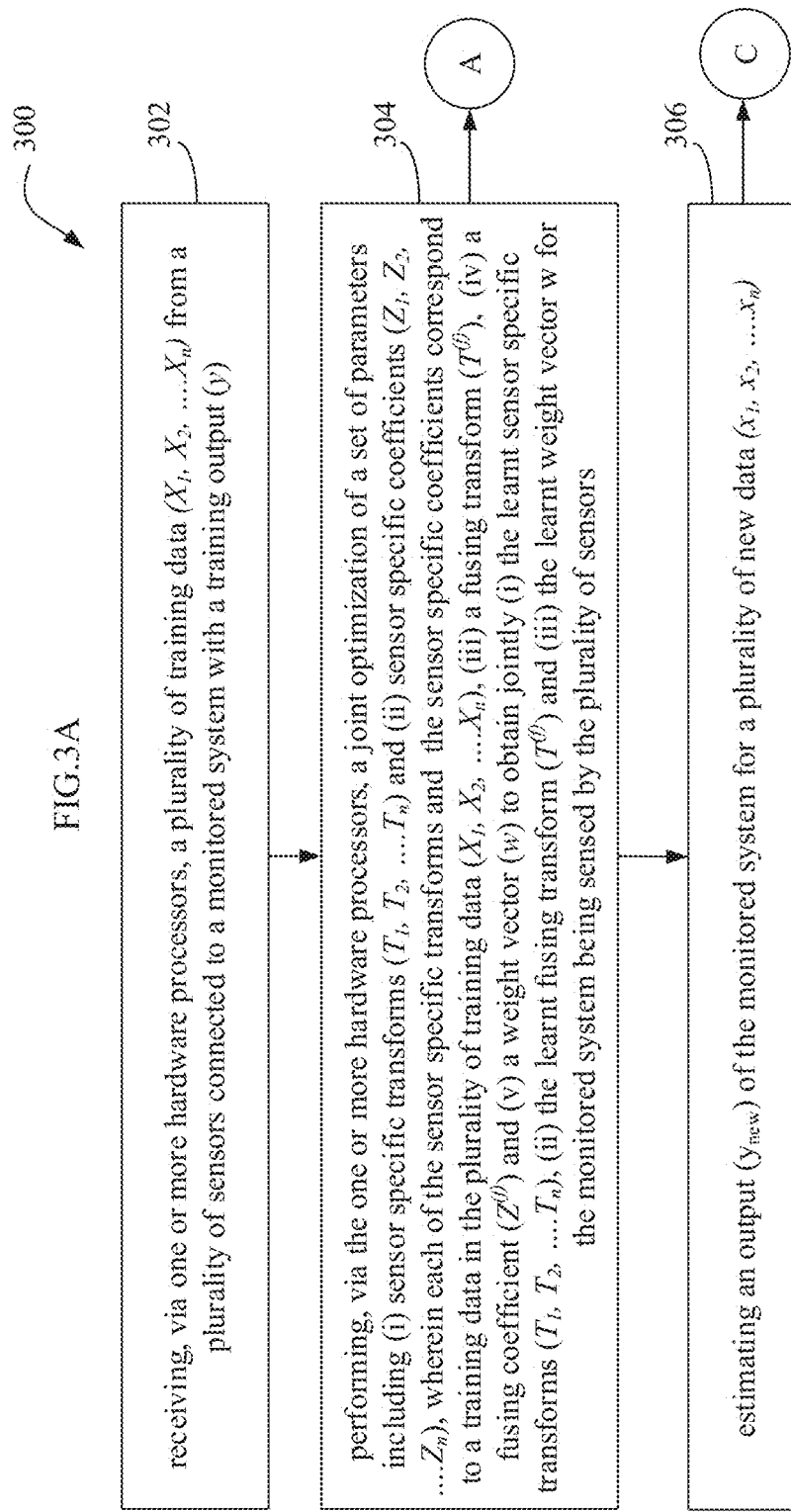
FIG. 3A through FIG. 3D illustrate an exemplary flow diagram of a computer implemented method for multi-sensor fusion using Transform Learning, in accordance with some embodiments of the present disclosure.
Figure 3B:
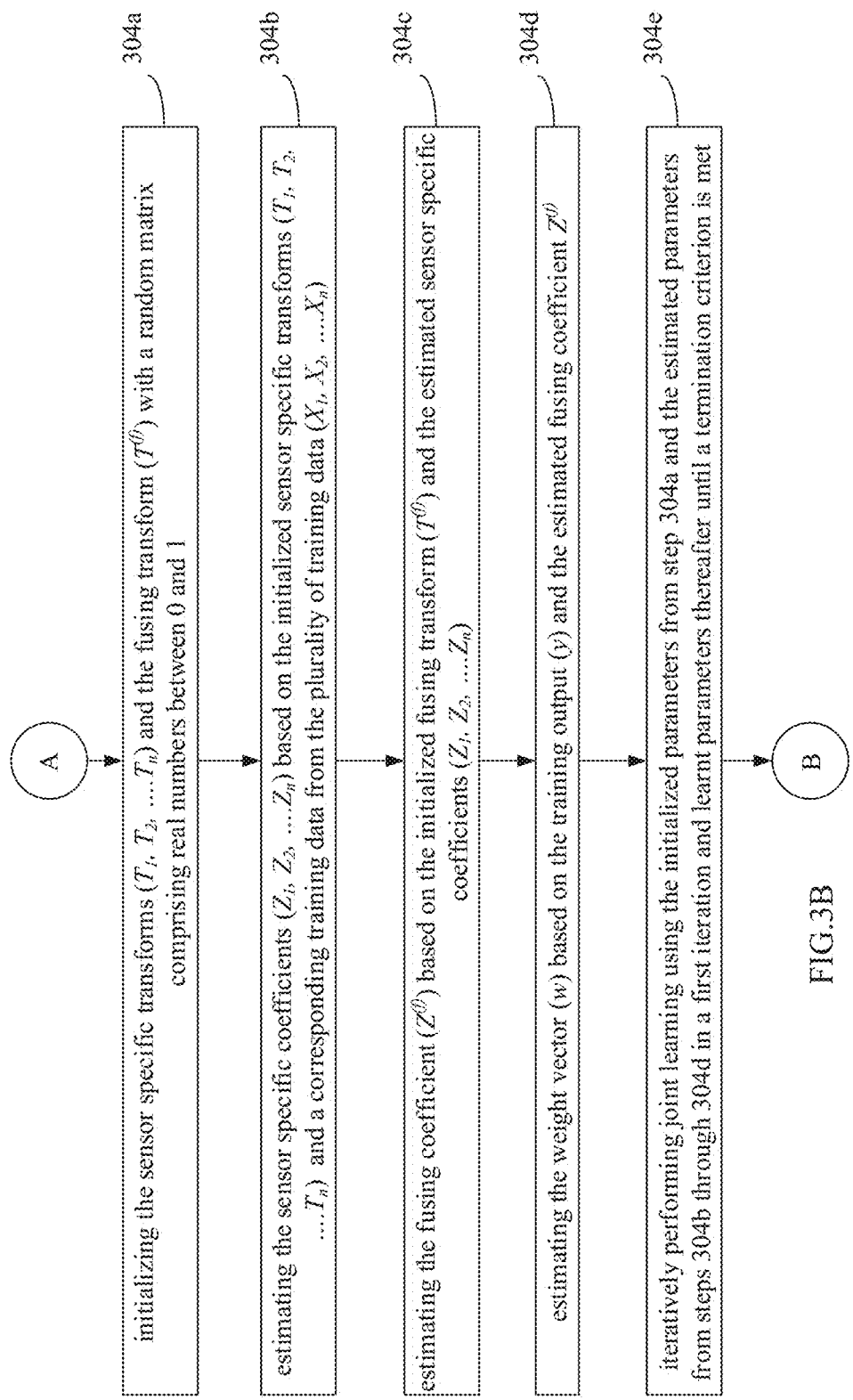
Figure 3C:
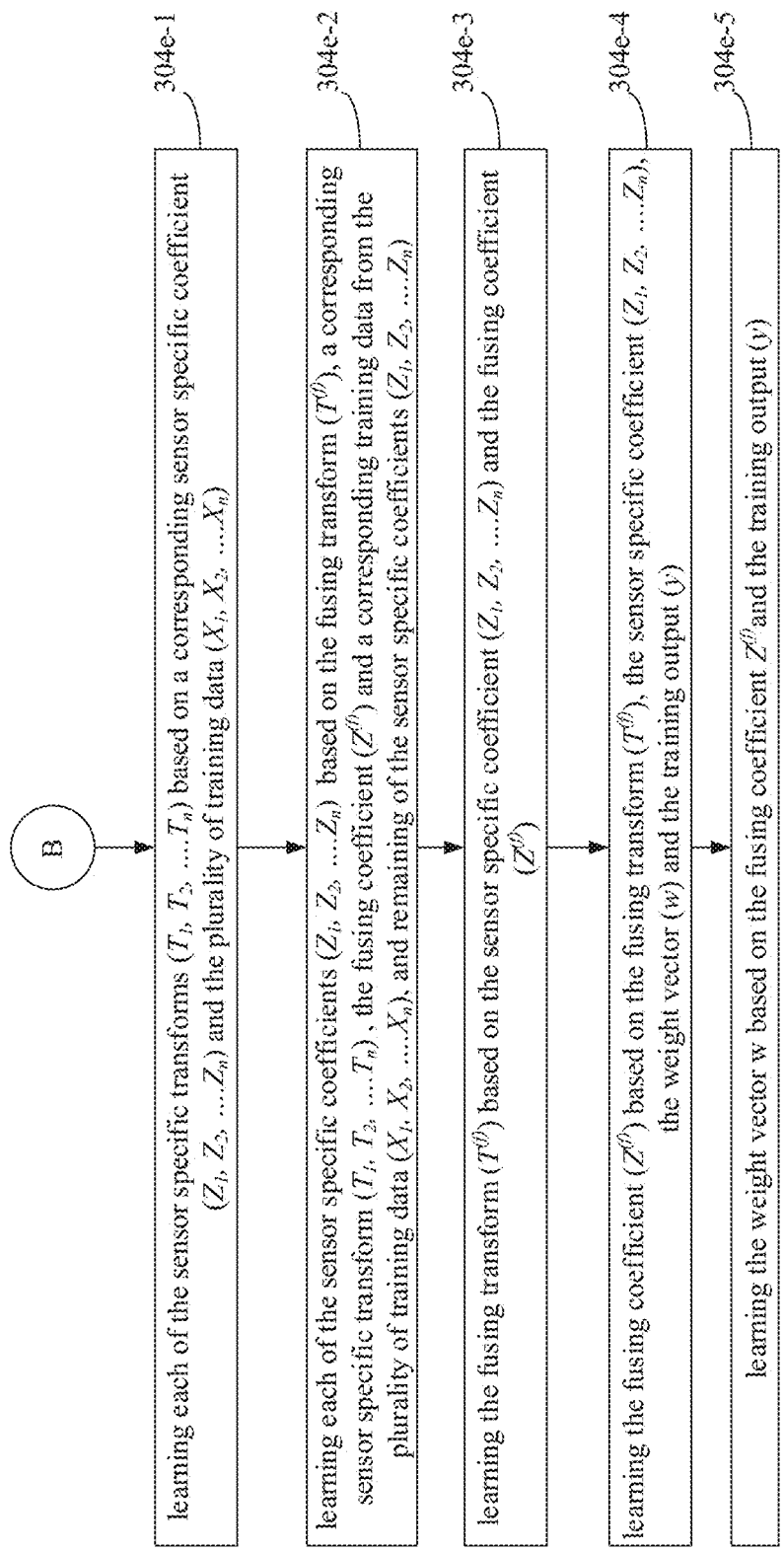
Figure 3D:
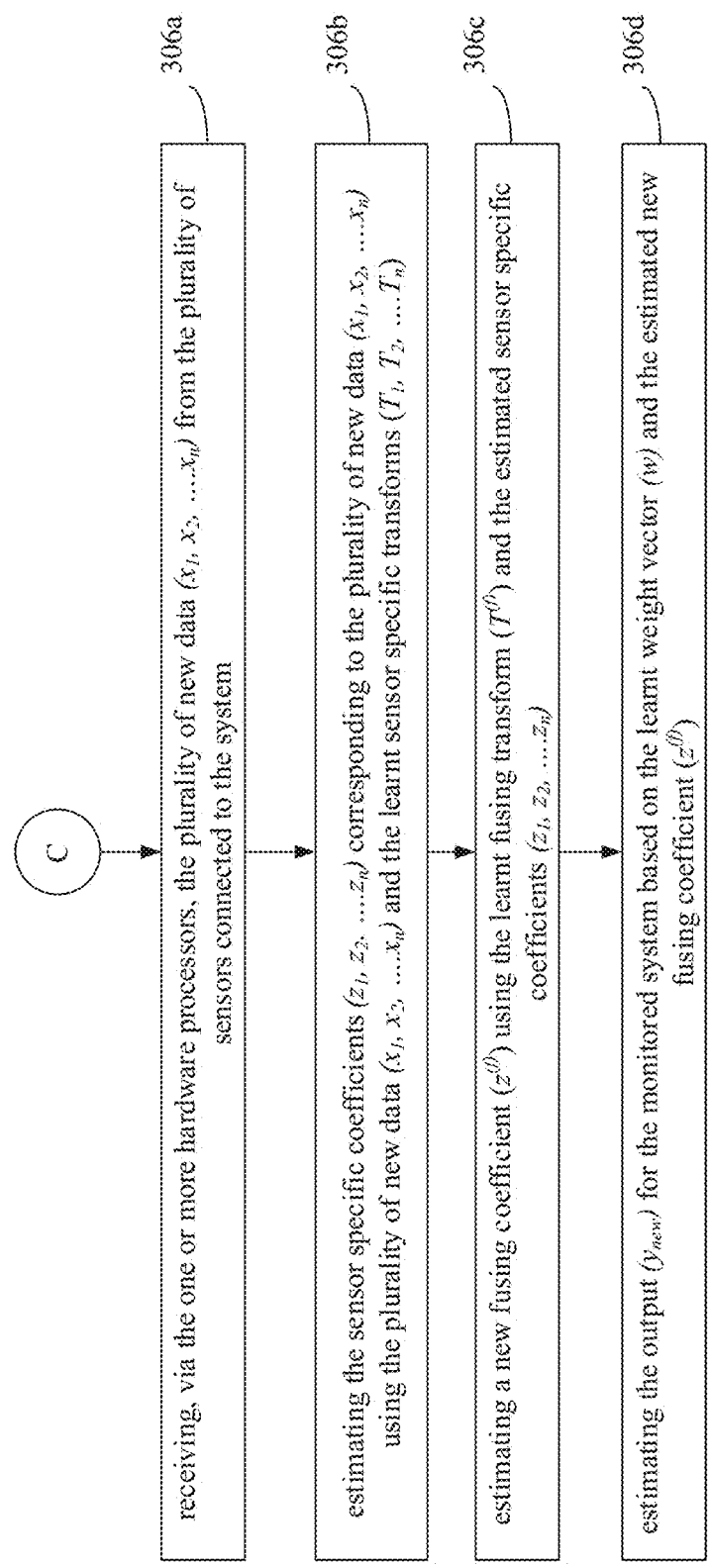

FIG. 2 is a high-level flow diagram 200 of a method for multi-sensor fusion using TL according to some embodiments of the present disclosure. In an exemplary monitored system such as a Friction Stir Welding (FSW) machine, there may be multiple sensors connected for measuring various parameters like force, pressure, and the like. As shown in FIG. 2, $(X_1, X_2, \ldots X_n)$ represent an input (a plurality of training data referred later in the description) to the exemplary monitored system, wherein the input is received from the plurality of sensors. ($T_1, T_2, \ldots T_n$) represent sensor specific transforms that are learnt to represent the corresponding sensor data. The sensor specific transforms are appropriately fused using a fusing transform (TD) which is learnt by utilizing the knowledge of an output (y) or a final inference (or training output referred later in the description). The illustrated flow diagram in FIG. 2 represents a supervised learning framework, where the transforms and weight matrix (for classification or regression) are learnt in a training phase and later utilized practically for carrying out multi-sensor fusion.

FIG. 3A through FIG. 3D illustrate an exemplary flow diagram of a computer implemented method 300 for multi-sensor fusion using Transform Learning, in accordance with some embodiments of the present disclosure. In an embodiment, the system for multi-sensor fusion 100 includes one or more data storage devices or memory 102 operatively coupled to the one or more processors 104 and is configured to store instructions configured for execution of steps of the method 300 by the one or more processors 104. The steps of the method 300 will now be explained in detail with reference to the components of the system for multi-sensor fusion 100 of FIG. 1 and the flow diagram 200 of FIG. 2. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Basic Transform Learning Framework for Fusion (TLF): Let the multiple sensors (plurality of sensors) be of length N samples given by $X_1 \in \mathbb{R}^{m_1 \times n}, \ldots, X_n \in \mathbb{R}^{m_n \times N}$, wherein $m_1, \ldots, m_n$ are feature lengths of the individual sensors. The output in terms of a regressor may be given as $y \in \mathbb{R}^{1 \times N}$. Multi-sensor fusion is carried out by learning the transforms and coefficients for each sensor, a fusing transform, its associated fusing coefficient and a weight matrix w together in a joint optimization framework.

Accordingly, in an embodiment of the present disclosure, the one or more processors 104, are configured to receive, at step 302, the plurality of training data ($X_1, X_2, \ldots X_n$) from the plurality of sensors connected to a monitored system with a training output (y). The training data ($X_1, X_2, \ldots X_n$) in the context of the present disclosure is a time series data. In an embodiment, the one or more processors 104, are configured to perform, at step 304, a joint optimization of a set of parameters including (i) sensor specific transforms ($T_1, T_2, \ldots T_n$) and (ii) sensor specific coefficients ($Z_1, Z_2, \ldots Z_n$), wherein each of the sensor specific transforms and the sensor specific coefficients correspond to a training data in the plurality of training data ($X_1, X_2, \ldots X_n$), (iii) a fusing transform ($T^{(f)}$), (iv) a fusing coefficient ($Z^{(f)}$), and (v) a weight matrix (w).

Without loss of generality, for n sensors, the joint optimization may be expressed as:

$$\min_{T_1,T_2,\ldots T_n, T^{(f)}, Z_1, Z_2, \ldots Z_n, Z^{(f)}, w} \|T_1 X_1 - Z_1\|_F^2 +$$

$$\|T_2 X_2 - Z_2\|_F^2 + \ldots + \|T_n X_n - Z_n\|_F^2 + \lambda_1 (\|T_1\|_F^2 - \log\det T_1) +$$

(12)

$$\lambda_2 (\|T_2\|_F^2 - \log\det T_2) + \ldots + \lambda_n (\|T_n\|_F^2 - \log\det T_n) +$$

$$\gamma \left\| T^{(f)} \begin{bmatrix} Z_1 \\ Z_2 \\ \vdots \\ Z_n \end{bmatrix} - Z^{(f)} \right\|_F^2 + \lambda (\|T^{(f)}\|_F^2 - \log\det T^{(f)}) + \alpha \|y - w Z^{(f)}\|_2^2$$

wherein $T_1 \in \mathbb{R}^{K_1 \times m_1}, T_2 \in \mathbb{R}^{K_2 \times m_2}, T_n \in \mathbb{R}^{K_n \times m_n}$ are the sensor specific transforms, $T^{(f)} \in \mathbb{R}^{K \times (K_1 + K_2 + \cdots K_n)}$ is the fusing transform, $Z_1 \in \mathbb{R}^{K_1 \times N}, Z_2 \in \mathbb{R}^{K_2 \times N}, Z_n \in \mathbb{R}^{K_n \times N}$ are the sensor specific coefficients, $Z^{(f)} \in \mathbb{R}^{K \times N}$ is the fusing coefficient and $w \in \mathbb{R}^{1 \times K}$ is the weight matrix being a weight vector provided the training output $y \in \mathbb{R}^{1 \times N}$, K being the size of the sensor specific transforms and the fusing transform and N being the number of measurements in the training data.

In an embodiment of the present disclosure, the joint optimization comprises initializing and estimating some of the parameters from the set of parameters followed by iteratively learning all of the parameters. In an embodiment, the sensor specific transforms ($T_1, T_2, \ldots T_n$) and the fusing transform ($T^{(f)}$) are initialized, at step 304a, with a random matrix comprising real numbers between 0 and 1. In an embodiment, the real numbers may be chosen from a uniform distribution. The sensor specific coefficients ($Z_1, Z_2, \ldots Z_n$) are estimated, at step 304b, based on the initialized sensor specific transforms ($T_1, T_2, \ldots T_n$) and a corresponding training data from the plurality of training data ($X_1, X_2, \ldots X_n$) as represented by Equation (1). The fusing coefficient ($Z^{(f)}$) is estimated, at step 304c, based on the initialized fusing transform ($T^{(f)}$) and the estimated sensor specific coefficients ($Z_1, Z_2, \ldots Z_n$). The weight matrix (w) is estimated, at step 304d, based on the training output (y) and the estimated fusing coefficient ($Z^{(f)}$).

Further, joint learning is performed iteratively, at step 304e, using the initialized parameters from step 304a and the estimated parameters from steps 304b through 304d in a first iteration and learnt parameters thereafter until a termination criterion is met to obtain jointly (i) the learnt sensor specific transforms ($T_1, T_2, \ldots T_n$), (ii) the learnt fusing transform ($T^{(f)}$) and (iii) the learnt weight matrix (w) for the monitored system being sensed by the plurality of sensors.

In an embodiment the joint learning comprises learning each of the sensor specific transforms ($T_1, T_2, \ldots T_n$), at step 304e-1, based on a corresponding sensor specific coefficient ($Z_1, Z_2, \ldots Z_n$) and the plurality of training data ($X_1, X_2, \ldots X_n$). The learning of the each of the sensor specific transforms may be represented as:

$$T_j \leftarrow \min_{T_j} \|T_j X_j - Z_j\|_F^2 + \lambda_j (\|T_j\|_F^2 - \log\det T_j) \text{ for } j = 1, \ldots, n \quad (13)$$

At step 304e-2, as part of the joint learning, each of the sensor specific coefficients ($Z_1, Z_2, \ldots Z_n$) are learnt based on the fusing transform ($T^{(f)}$), a corresponding sensor specific transform ($T_1, T_2, \ldots T_n$), the fusing coefficient ($Z^{(f)}$) and a corresponding training data from the plurality of training data ($X_1, X_2, \ldots X_n$), and remaining of the sensor specific coefficients ($Z_1, Z_2, \ldots Z_n$). The learning of each of the sensor specific coefficients ($Z_1, Z_2, \ldots Z_n$) may be represented as:

$$Z_j = (\gamma T_j^{(f)T} T_j^{(f)} + 1)^{-1} \cdot (T_j X_j + \gamma T_j^{(f)T} (Z^{(f)} - \Sigma_{i=1, i \neq j}^n T_i^{(f)} Z_i)))$$
$$\text{for } j = 1, \ldots, n \quad \rightarrow (14)$$

At step 304e-3, as part of the joint learning, the fusing transform ($T^{(f)}$) is learnt based on the sensor specific coefficient ($Z_1, Z_2, \ldots Z_n$) and the fusing coefficient ($Z^{(f)}$).

At step 304e-4, as part of the joint learning, the fusing coefficient ($Z^{(f)}$) is learnt based on the fusing transform ($T^{(f)}$), the sensor specific coefficient ($Z_1, Z_2, \ldots Z_n$), the weight matrix (w) and the training output (y).

The learning of the fusing coefficient $Z^{(f)}$ may be represented as:

$$Z^{(f)} = (I - \alpha w^T w)^{-1} \cdot (T^{(f)} Z' + \alpha w^T y), \text{ wherein } Z' = \begin{bmatrix} Z_1 \\ Z_2 \\ \vdots \\ Z_n \end{bmatrix} \quad (15)$$

At step 304e-5, as part of the joint learning, the weight matrix (w) is learnt based on the fusing coefficient ($Z^{(f)}$) and the training output (y). The learning of the weight matrix (w) may be represented as:

$$w \leftarrow \min_{w} \alpha \|y - w Z^{(f)}\|_2^2 \quad (16)$$

In accordance with an embodiment of the present disclosure, the termination criterion is one of (i) completion of a predefined number of iterations (Maxiter) and (ii) difference of the fusing transform ($T^{(f)}$) of a current iteration and the fusing transform ($T^{(f)}$) of a previous iteration being less than an empirically determined threshold value (Too. Typically, the empirically determined threshold value is a very low value e.g. 0.001.

Having obtained jointly (i) the learnt sensor specific transforms ($T_1, T_2, \ldots T_n$) in Equation (13), (ii) the learnt fusing transform ($T^{(f)}$) based on Equation (6-8) (Refer step 10 in Algorithm 1 below, wherein X=Z') and (iii) the learnt weight matrix (w) in Equation (16) for the monitored system being sensed by the plurality of sensors, in an embodiment of the present disclosure, the one or more processors 104, are configured to estimate, at step 306, an output ($y_{new}$) of the monitored system for a plurality of new data ($x_1, x_2, \ldots x_n$). In the context of the present disclosure, the new data is also a time series data. In an embodiment, the step of estimating the output ($y_{new}$) of the monitored system represents application of the method 300 of the present disclosure to the monitored system using new data which is different from the training data ($X_1, X_2, \ldots X_n$) that was used in the earlier steps.

In an embodiment, at step 306a, the one or more hardware processors are configured to receive the plurality of new data ($x_1, x_2, \ldots x_n$) from the plurality of sensors connected to the monitored system. The sensor specific coefficients ($z_1, z_2, \ldots z_n$) corresponding to the plurality of new data ($x_1, x_2, \ldots x_n$) are estimated, at step 306b, using the plurality of new data ($x_1, x_2, \ldots x_n$) and the learnt sensor specific transforms ($T_1, T_2, \ldots T_n$). The estimation of the sensor specific coefficients ($z_1, z_2, \ldots z_n$) corresponding to the plurality of new data ($x_1, x_2, \ldots x_n$) may be represented as:

$$z_j = T_j x_j, \text{ for } j = 1, \ldots, n. \quad \rightarrow (17)$$

A new fusing coefficient $z^{(f)}$ is then estimated, at step 306c, using the learnt fusing transform ($T^{(f)}$) and the estimated sensor specific coefficients ($z_1, z_2, \ldots z_n$). The estimation of the new fusing coefficient $z^{(f)}$ may be represented as:

$$z^{(f)} = T^{(f)} \begin{bmatrix} z_1 \\ z_2 \\ \vdots \\ z_n \end{bmatrix} \quad (18)$$

The output ($y_{new}$) is estimated, at step 306d, for the monitored system based on the learnt weight matrix (w) and the estimated new fusing coefficient $z^{(f)}$. The estimation of the output ($y_{new}$) for the monitored system may be represented as:

$$y_{new} = w z^{(f)} \quad \rightarrow (19)$$

Kernel Transform Learning Framework for Fusion (KTLF): To capture complex non-linear relationship in the data, in accordance with an embodiment of the present disclosure, the plurality of training data ($X_1, X_2, \ldots X_n$) and the plurality of new data ($x_1, x_2, \ldots x_n$) are kernelized using a kernel function. The kernel function may be a radial basis function, a polynomial kernel, and the like. In an embodiment, a kernel version of the joint optimization of Equation (12) may be represented as:

$$
\begin{aligned}
\min_{B_1 B_2, \ldots, B_n, T^{(f)}, Z_1, Z_2, \ldots, Z_n, Z^{(f)}, w} & \|B_1 \mathcal{K}(X_1, X_1) - Z_1\|_F^2 + \\
& \|B_2 \mathcal{K}(X_2, X_2) - Z_2\|_F^2 + \ldots + \|B_n \mathcal{K}(X_n, X_n) - Z_n\|_F^2 + \\
& \lambda_1 (\|B_1\|_F^2 - \log\det B_1) + \lambda_2 (\|B_2\|_F^2 - \log\det B_2) + \\
& \ldots + \lambda_n (\|B_n\|_F^2 - \log\det B_n) + \gamma \left\| T^{(f)} \begin{bmatrix} Z_1 \\ Z_2 \\ \vdots \\ Z_n \end{bmatrix} - Z^{(f)} \right\|_F^2 + \\
& \lambda (\|T^{(f)}\|_F^2 - \log\det T^{(f)}) + \alpha \|y - w Z^{(f)}\|_2^2
\end{aligned} \quad (20)
$$

The closed form solution updates of Equations (13) and (14) for B and Z in the kernelized version remains the same with the only difference being that the kernelized version of the input data $\mathcal{K}(X_j, X_j)$ for $j = 1, \ldots, n$ is utilized. It may be noted that the updates for the fusing transform $T^{(f)}$ and the fusing coefficient $Z^{(f)}$ also remain the same as in the TLF. The sensor specific coefficients ($z_1, z_2, \ldots z_n$) corresponding to the plurality of new data ($x_1, x_2, \ldots x_n$) in the kernelized version may be represented as:

$$z_j = B_j \mathcal{K}(x_j, X_j), \text{ for } j = 1, \ldots, n \quad \rightarrow (21)$$

The new fusing coefficient $z^{(f)}$ in the kernelized version may be represented as:

$$z^{(f)} = T^{(f)} \begin{bmatrix} z_1 \\ z_2 \\ \vdots \\ z_n \end{bmatrix} \quad (22)$$

The output ($y_{new}$) for the monitored system in the kernelized version may be represented as:

$$y_{new} = w z^{(f)} \quad \rightarrow (23)$$

The pseudocode for TLF and KTLF algorithm (using n=3) explained herein above is presented in Algorithm 1 below.

Algorithm 1: Transform and Kernel Transform Learning for Fusion (TLF or KTLF)

Input: Set of training data, $(X_1, X_2, X_3)$, training output (y), size of transforms (atoms) $K_1, K_2, K_3$, hyperparameters $\lambda_1, \lambda_2, \lambda_3$, $\alpha$, $\gamma$, predefined number of iterations (Maxiter), kernel function $\mathcal{K}$ and new data for which output needs to be estimated $(x_1, x_2, x_3)$, Output: Learnt sensor specific transforms $(T_1, T_2, T_3)$ or $(B_1, B_2, B_3)$, (ii) the learnt fusing transform $(T^{(f)})$ (iii) the learnt weight matrix (w) and the estimated output $(y_{new})$.

Initialization: Set sensor specific transforms $(T_1, T_2, T_3)$ and the fusing transform $(T^{(f)})$ to a random matrix comprising real numbers between 0 and 1 drawn from a uniform distribution.

$Z_1 = T_1 X_1$ or $B_1 \mathcal{K}(X_1, X_1)$, $Z_2 = T_2 X_2$ or $B_2 \mathcal{K}(X_2, X_2)$, $Z_3 = T_3 X_3$ or $B_3 \mathcal{K}(X_3, X_3)$  $Z^{(f)} = T^{(f)} Z'$, $w = y_{new} Z^{\dagger}$ ($\dagger$ denotes pseudo-inverse) and iteration i=1

1: procedure
2: loop: Repeat until convergence (or Maxiter)
3: $Z_{1i}$←update using Equation (14) with $T_{1i}$ (or $B_{1i}$)
4: $T_{1i}$ (or $B_{1i}$)←update using Equations (6)-(8) with $X=X_1$ (or $\mathcal{K}(X_1, X_1)$)
5: $Z_{2i}$←update using Equation (14) with $T_{2i}$ (or $B_{2i}$)
6: $T_{2i}$ (or $B_{2i}$)←update using Equations (6)-(8) with $X=X_2$ (or $\mathcal{K}(X_2, X_2)$)
7: $Z_{3i}$←update using Equation (14) with $T_{3i}$ (or $B_{3i}$)
8: $T_{3i}$ (or $B_{3i}$)←update using Equations (6)-(8) with $X=X_3$ (or $\mathcal{K}(X_3, X_3)$)
9: $Z_i^{(f)}$←updated using Equation (15) with $T_i^{(f)}$
10: $T_i^{(f)}$←updated using Equations (6)-(8) with X=Z'
11: $w_i \leftarrow Y_{new} Z_i^{(f)\dagger}$
12: i←i+1
13: If $\|T_i^{(f)} - T_{i-1}^{(f)}\|_F <$Tol or l==Maxiter then
14: Compute sensor specific coefficients $(z_1, z_2, z_3)$ and new fusing coefficient $z^{(f)}$ using Equation (17-18) or (21-22)
15: $y_{new} = w z^{(f)}$
16: close;
17: else go to loop

EXPERIMENTAL RESULTS

The applicability of the method 300 and system 200 of the present disclosure for multi-sensor fusion is demonstrated using two different real-life scenarios. The first one using the machinery data from Friction Stir Welding (FSW) machine; and the other one using Building Energy Consumption (BEC) data from office buildings. The performance of the method is evaluated using Mean Square Error (MSE) and Mean Absolute Error (MAE) metrics. A comparative study is presented with the regression techniques based on TL i.e., Transform Learning for Regression (TLR) and Kernel Transform Learning for regression (KTLR). Since DL based techniques are more prevalent, a comparison against the DL counterparts i.e., Dictionary Learning for Regression (DLR) and the Kernel Dictionary Learning for Regression (KDLR) are also provided.

Most kernel versions make use of the radial basis function kernel for fair comparison. It is known that the accuracy of TL and DL techniques highly depend on atom size and values of the hyper-parameters used in solving the optimization problem. Hence these are tuned appropriately, and the results are presented with the best configuration for each technique. The input data for the KTLR, KDLR, TLR and DLR techniques is obtained by row-wise stacking the individual sensor data to carry out fusion at the raw sensor data level. In addition to the multi-sensor case, the results obtained using individual sensors are also reported to re-emphasize the need for sensor fusion. For the single sensor case, KTLR technique is used since is performs better than TLR.

FSW Machine Data: FSW is an advanced technique used for joining two similar or dis-similar materials. FSW machines are known to produce superior quality weld compared to other techniques using lesser energy. Owing to the various advantages of this solid-state joining process, there is a need to assess the quality of the weld and control the defects. Relevant sensors were connected to these machines to study the health of the machine and the welding process in real-time. The experimental data was collected for weld quality assessment using the FSW machine. Data from three sensors; Force, Torque and Power are captured at 10 Hz for each welding process. They served as an input to the method of the present disclosure. The output is a single value for weld quality which is measured manually in terms of Ultimate Tensile Strength (UTS). A total of 40 experiments were carried out on an aluminum alloy for different values of spindle RPM (Rotations Per Minute) and welding speed to create weld samples.

The data contains 1000 samples of Force, Torque and Power signals for each experiment or welding process. This data was normalized and split into windows of 50 samples each, serving as the feature length for all the sensors. In this case, the output UTS is a vector $y_{new} \in \mathbb{R}^{1 \times N}$ where $$N = \left(\frac{40 \times 1000}{50} = 800\right).$$

The sensor specific transforms were learnt for the three sensors along with the fusing transform and regression weights relating the UTS value to sensor data. 5-fold cross-validation was carried out to generate the results.

Table I presents the comparative results for UTS estimation using MSE and MAE for different techniques.

| Method | MSE | MAE |
|---|---|---|
| KDLR | 0.0133 ± 0.004 | 0.0736 ± 0.008 |
| KTLR | 0.0112 ± 0.002 | 0.0671 ± 0.006 |
| KTLF | 0.0088 ± 0.002 | 0.0662 ± 0.004 |
| DLR | 0.0306 ± 0.004 | 0.1178 ± 0.012 |
| TLR | 0.0295 ± 0.016 | 0.1156 ± 0.008 |
| TLF | 0.0202 ± 0.004 | 0.1084 ± 0.012 |
| Force | 0.0212 ± 0.004 | 0.1102 ± 0.011 |
| Torque | 0.0216 ± 0.005 | 0.0999 ± 0.008 |
| Power | 0.0400 ± 0.005 | 0.1683 ± 0.010 |

Figure 4A:
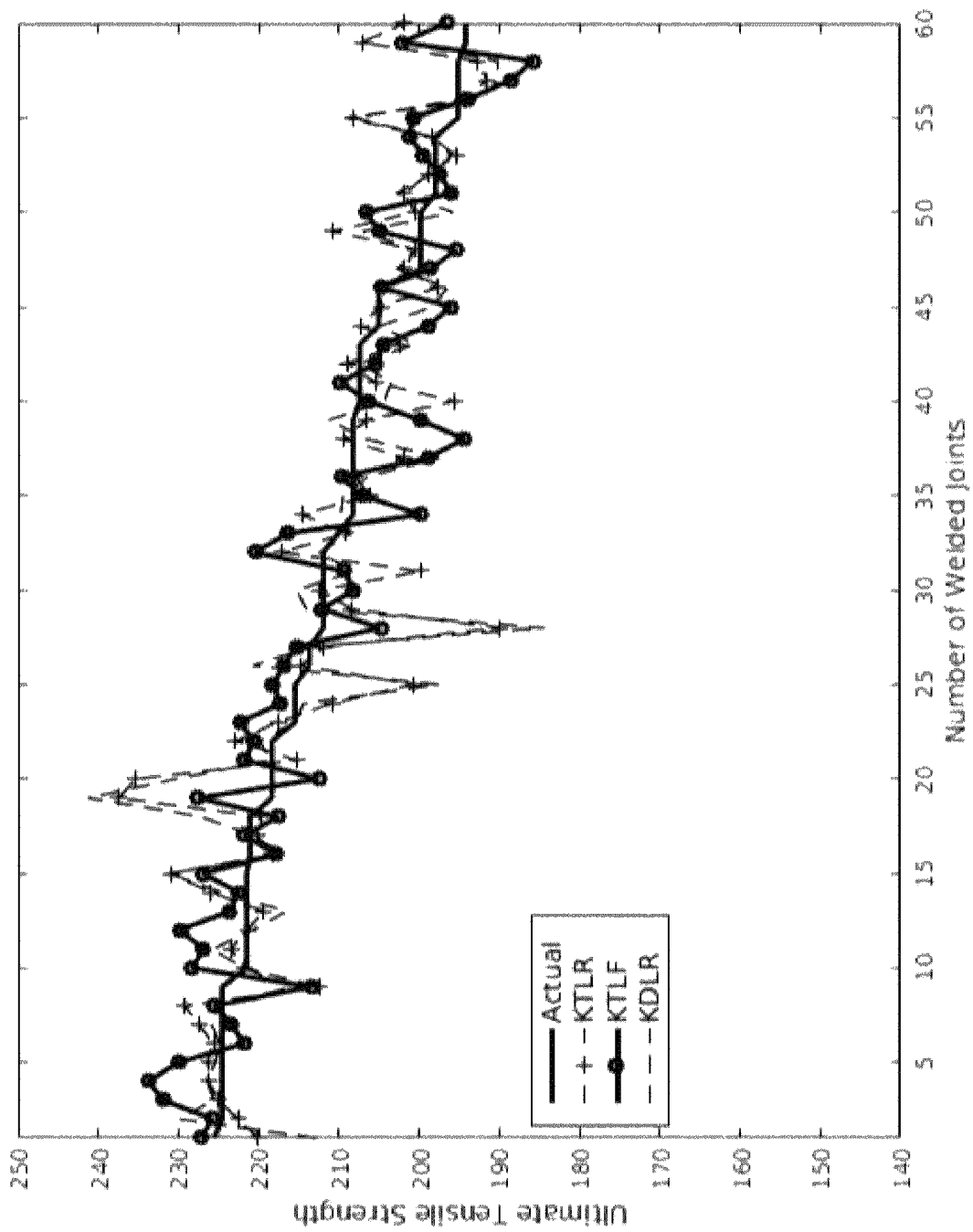
FIG. 4A illustrates Ultimate Tensile Strength (UTS) of welded joints estimated using kernel-based methods known in the art and the kernel-based method according to some embodiments of the present disclosure.
Figure 4B:
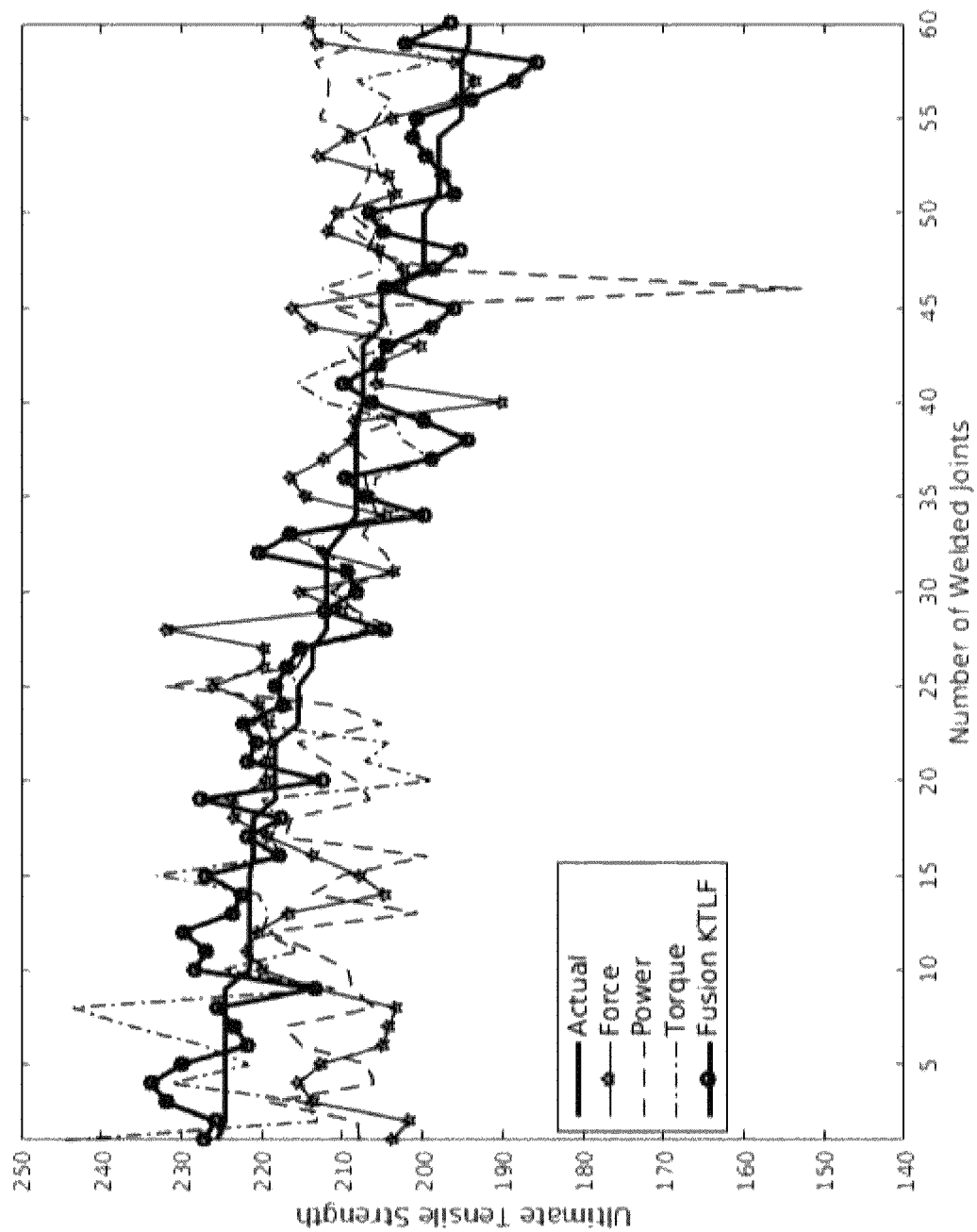
FIG. 4B illustrates Ultimate Tensile Strength (UTS) of welded joints estimated using sensors individually versus all sensors by the multi-sensor fusion using the kernel-based method according to some embodiments of the present disclosure.

The UTS estimation results obtained using individual sensors are also presented for reference. It is clearly evident from the table, that the multi-sensor configuration performs better than the sensors individually. Further, it can be observed that, in the multi-sensor configuration, the kernel variants perform better than basic variants. The KTLF method of the present disclosure outperforms other methods significantly. FIG. 4A illustrates Ultimate Tensile Strength (UTS) of welded joints estimated using kernel-based methods known in the art and the kernel-based method according to some embodiments of the present disclosure. FIG. 4B illustrates Ultimate Tensile Strength (UTS) of welded joints estimated using sensors individually versus all sensors by the multi-sensor fusion using the kernel-based method according to some embodiments of the present disclosure.

Building Energy Consumption Data: Aggregate power consumption data from office building is considered for half day ahead load forecasting. Load forecasting is framed as a regression problem where previous day power (PDay Power) consumption measurements from smart meter and day ahead temperature forecast are treated as different sensors and taken as model input. A virtual sensor was created using one-week lag values of the power data with respect to the forecast day and considered as an additional input. This corresponds to previous week same day power consumption measurements (PWDay Power). The output is half day ahead power consumption forecast of the building.

The office building data comprised of 6.5 months aggregate active power consumption measurements taken every 15 minutes. The data is normalized and half day data which corresponds to 48 samples are considered as feature length for all the sensors. Here, 6 months data is considered for training, where the transforms and the regression weights are learnt. The output in this case is a matrix $y_{new} \in \mathbb{R}^{48 \times N}$, here 48 samples corresponds to half day ahead forecast and $N=6 \times 30 \times 2=360$ (half day forecast instances). Thus, the regression weights are $w \in \mathbb{R}^{48 \times K}$ with K being the number of atoms of the transform or dictionary. Similar to the previous case, 5-fold cross-validation was carried out to generate the results.

| Table II presents the comparative results for half day ahead load forecasting using MSE and MAE for different techniques for both mufti-sensor and sensors individually case. | | |
|---|---|---|
| Method | MSE | MAE |
| KDLR | 0.0251 ± 0.0100 | 0.0959 ± 0.0199 |
| KTLR | 0.0252 ± 0.0100 | 0.0944 ± 0.0191 |
| KTLF | 0.0121 ± 0.0023 | 0.0726 ± 0.0059 |
| DLR | 0.0350 ± 0.0060 | 0.1318 ± 0.0109 |
| TLR | 0.0382 ± 0.0096 | 0.1217 ± 0.0064 |
| TLF | 0.0254 ± 0.0079 | 0.1067 ± 0.0159 |
| Force | 0.0201 ± 0.0038 | 0.0991 ± 0.0084 |
| Torque | 0.0220 ± 0.0039 | 0.1014 ± 0.0036 |
| Power | 0.0171 ± 0.0035 | 0.821 ± 0.0083 |

Figure 5A:
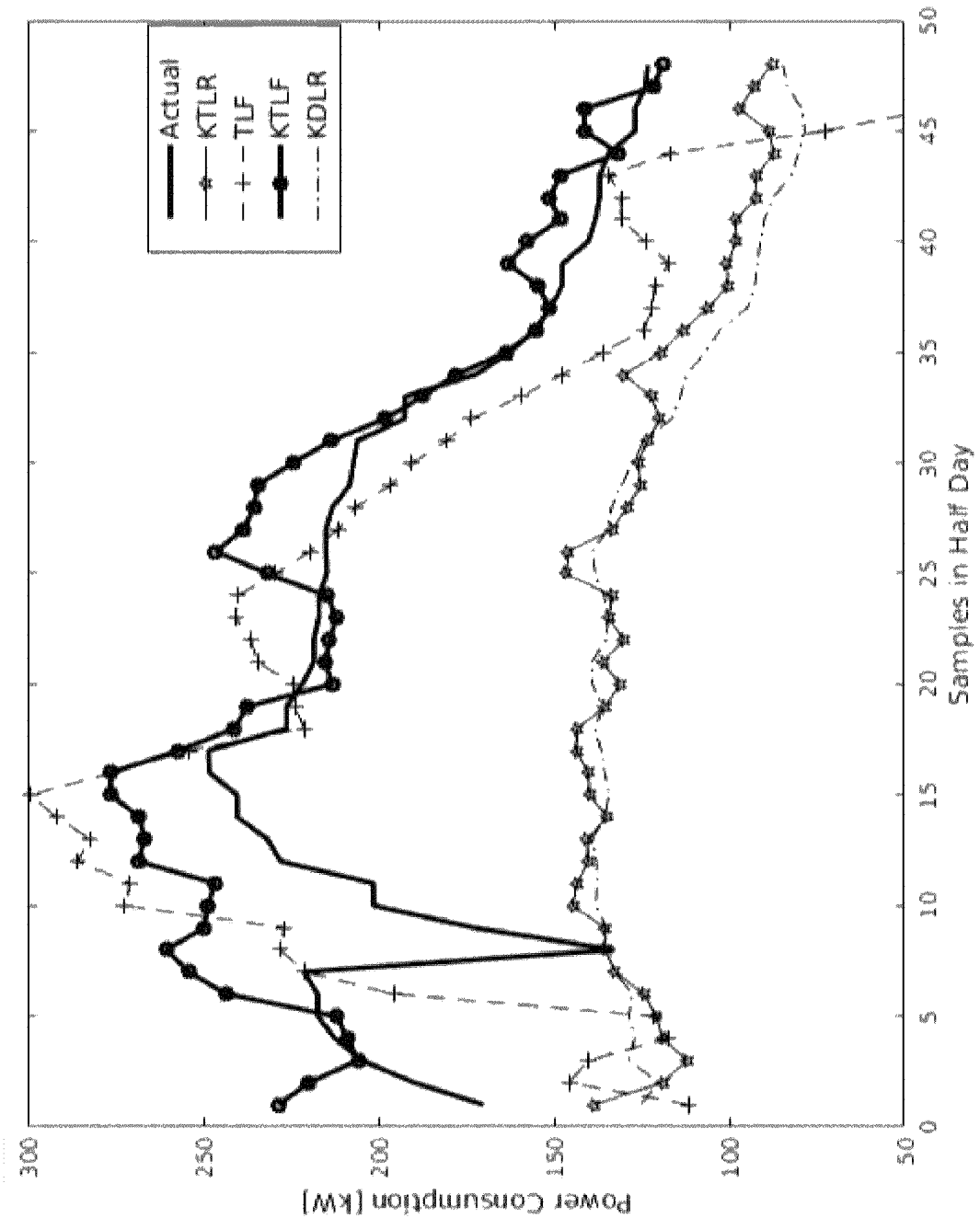
FIG. 5A illustrates half day ahead building power consumption forecast obtained using kernel-based methods known in the art and the multi-sensor fusion using the methods according to some embodiments of the present disclosure.
Figure 5B:
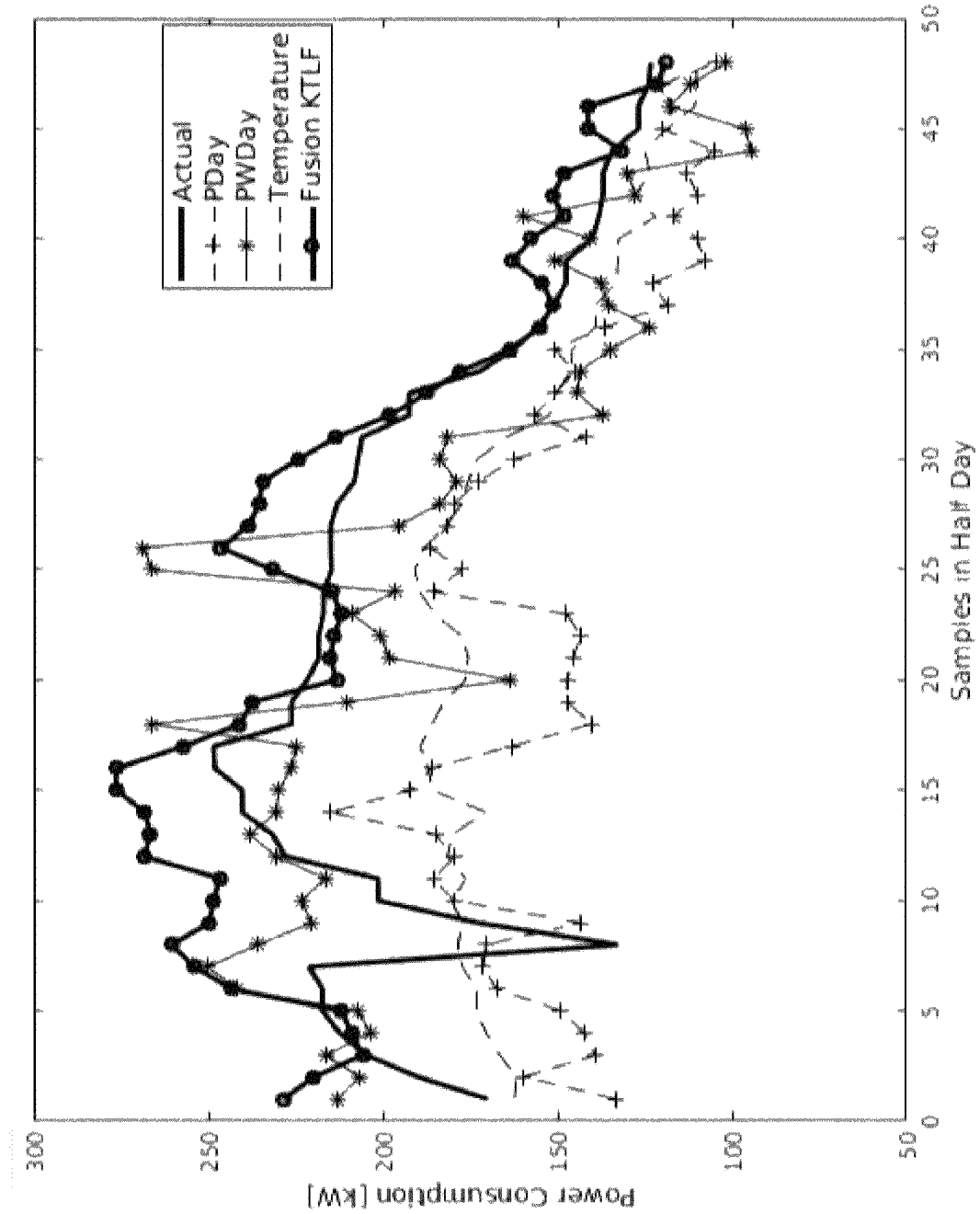
FIG. 5B illustrates half day ahead building power consumption forecast obtained using sensors individually versus all sensors by the multi-sensor fusion using the kernel-based method according to some embodiments of the present disclosure.

Although the previous week same day (PWDay) power consumption alone provides a good prediction, using all the three sensors together result in better forecasting accuracy in case of KTLF. It is evident from the table that the feature level based fusion method KTLF of the present disclosure outperforms other methods based on stacking the raw data from different sensors together to carry out fusion (DLR, KDLR, TLR and KTLR). For this data, the accuracy of TLF method is comparable to that of the other kernel methods (KDLR and KTLF). To emphasize on the difference between raw sensor data stacking and feature level fusion, FIG. 5A illustrates half day ahead building power consumption forecast obtained using kernel-based methods known in the art and the multi-sensor fusion using the methods according to some embodiments of the present disclosure. It can be seen that KTLF and TLF are able to capture the variations in the power consumption much better than KDLR and KTLR. The importance of fusion is demonstrated by FIG. 5B that illustrates half day ahead building power consumption forecast obtained using sensors individually versus all sensors by the multi-sensor fusion using the kernel-based method according to some embodiments of the present disclosure.

The results thus obtained from both the datasets demonstrate the better performance of transform learning based techniques over the dictionary counterparts. As expected, the kernel versions of the techniques perform better than the basic or non-kernelized versions. Also, it may be observed, the method TLF of the present disclosure has better performance compared to the other basic versions. Further, it may be noted that the KTLF of the present disclosure has the best performance both in terms of MSE and MAE, thus demonstrating the potential of the method and system of the present disclosure for multi-sensor fusion.

It may be understood by those skilled in the art that the usefulness of the method and system of the present disclosure has been demonstrated using data from the manufacturing and energy domain, but they can be applied to other domains as well, such as, to estimate blood pressure from Electrocardiogram (ECG) and Photoplethysmogram (PPG) signals in the medical domain. Likewise, although the examples provided relate to regression tasks, the method and system of the present disclosure may be applied to classification tasks as well by considering the estimated output ($y_{new}$) to be discretized in terms of labels. For classification tasks, output $Y=[Y_{new1}, Y_{new2} \ldots Y_{newN}] \in \mathbb{R}^{L \times N}$; L×N is the label matrix of the input, where L is the number of classes and N is the length of the input. $y_{newi}=[0,0, \ldots 0,1,0, \ldots 0]^T$ contains only zeros apart from the index corresponding to an output class. The weights may be then specified as regression or classification weights depending on the task. In the exemplary UTS estimation study, the UTS estimation results may also be considered for a classification task by quantizing the continuous output $y_{new}$ and creating labels e.g. classification of weld—good/average/bad.

With the advancement of sensor technology and the associated signal processing, multi-sensor fusion is increasingly finding its usage in several areas such as in many biomedical applications, sensor networks, robotics, etc. In addition, it also plays a significant role in emerging instances of cyber-physical systems like smart grid and smart manufacturing; primarily employed to improve the decision-making capability of predictive and prescriptive analytics built on such systems. Thus, the method and system of the present disclosure can find application in all such areas employing multiple sensors that are mostly heterogeneous in nature.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the embodiments or if they include equivalent elements with insubstantial differences from the literal language of the embodiments described herein.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method comprising the steps of:
receiving, via one or more hardware processors, a plurality of training data $(X_1, X_2, \ldots X_n)$ from a plurality of sensors connected to a monitored system with a training output (y);
performing, via the one or more hardware processors, a joint optimization of a set of parameters including (i) sensor specific transforms $(T_1, T_2, \ldots T_n)$ and (ii) sensor specific coefficients $(Z_1, Z_2, \ldots Z_n)$, wherein each of the sensor specific transforms and the sensor specific coefficients correspond to a training data in the plurality of training data $(X_1, X_2 \ldots X_n)$, (iii) a fusing transform $(T^{(f)})$, (iv) a fusing coefficient $(Z^{(f)})$, and (v) a weight matrix (w), and wherein the joint optimization comprises:
  initializing the sensor specific transforms $(T_1\ T_2, \ldots T_n)$ and the fusing transform $(T^{(f)})$ with a random matrix comprising real numbers between 0 and 1;
  estimating the sensor specific coefficients $(Z_1, Z_2, \ldots Z_n)$ based on the initialized sensor specific transforms $(T_1, T_2, \ldots T_n)$ and a corresponding training data from the plurality of training data $(X_1, X_2 \ldots X_n)$;
  estimating the fusing coefficient $(Z^{(f)})$ based on the initialized fusing transform $(T^{(f)})$ and the estimated sensor specific coefficients $(Z_1, Z_2, \ldots Z_n)$;
  estimating the weight matrix (w) based on the training output (y) and the estimated fusing coefficient $(Z^{(f)})$; and
  iteratively performing joint learning using the initialized parameters and the estimated parameters from the set of parameters, in a first iteration and learnt parameters thereafter until a termination criterion is met, the joint learning comprising:
    learning each of the sensor specific transforms $(T_1, T_2, \ldots T_n)$ based on a corresponding sensor specific coefficient $(Z_1, Z_2, \ldots Z_n)$ and the plurality of training data $(X_1, X_2, \ldots X_n)$;
    learning each of the sensor specific coefficients $(Z_1, Z_2, \ldots Z_n)$ based on the fusing transform $(T^{(f)})$, a corresponding sensor specific transform $(T_1, T_2, \ldots T_n)$, the fusing coefficient $(Z^{(f)})$ and a corresponding training data from the plurality of training data $(X_1, X_2, \ldots X_n)$, and remaining of the sensor specific coefficients $(Z_1, Z_2, \ldots Z_n)$;
    learning the fusing transform $(T^{(f)})$ based on the sensor specific coefficient $(Z_1, Z_2, \ldots Z_n)$ and the fusing coefficient $(Z^{(f)})$;
    learning the fusing coefficient $(Z^{(f)})$ based on the fusing transform $(T^{(f)})$, the sensor specific coefficient $(Z_1, Z_2, \ldots Z_n)$, the weight matrix (w) and the training output (y); and
    learning the weight matrix (w) based on the fusing coefficient $(Z^{(f)})$ and the training output (y);
  wherein the termination criterion is one of (i) completion of a predefined number of iterations (Maxiter) and (ii) difference of the fusing transform $(T^{(f)})$ of a current iteration and the fusing transform $(T^{(f)})$ of a previous iteration being less than an empirically determined threshold value (Tol);
to obtain jointly (i) the learnt sensor specific transforms $(T_1, T_2, \ldots T_n)$, (ii) the learnt fusing transform $(T^{(f)})$ and (iii) the learnt weight matrix (w) for the monitored system being sensed by the plurality of sensors; and estimating, via the one or more hardware processors, an output ($y_{new}$) of the monitored system for a plurality of new data ($x_1, x_2, \ldots x_n$), wherein the new data is a time series data and estimating the output represents application of the method to the monitored system using the new data which is different from the training data ($X_1, X_2, \ldots X_n$), wherein the monitored system is a Friction Stir Welding (FSW) machine, wherein the output (y) is a value representing an Ultimate Tensile Strength (UTS) indicative of the quality of the weld performed by the FSW machine, wherein the step of estimating the output ($y_{new}$) of the FSW machine comprises:
receiving the plurality of new data ($x_1, x_2, \ldots x_n$) from the plurality of sensors connected to the FSW machine, wherein the sensors measure parameters pertaining to a force, a torque, and a power for a welding process implemented in real-time;
estimating the sensor specific coefficients ($z_1, z_2, \ldots z_n$) corresponding to the plurality of new data ($x_1, x_2, \ldots x_n$) using the received plurality of new data ($x_1, x_2, \ldots x_n$) and the learnt sensor specific transforms ($T_1, T_2, \ldots T_n$), wherein the sensor specific transforms are learnt to represent corresponding sensor data;
estimating a new fusing coefficient $z^{(f)}$ using the learnt fusing transform ($T^{(f)}$) and the estimated sensor specific coefficients ($z_1, z_2 \ldots z_n$); and
estimating the output ($y_{new}$) for the FSW machine based on the learnt weight matrix (w) and the estimated new fusing coefficient $z^{(f)}$.

2. The processor implemented method of claim 1, wherein the joint optimization is represented as $$\min_{T_1 T_2, \ldots, T_n, T^{(f)} Z_1, Z_2, \ldots, Z_n, Z^{(f)}, w} \|T_1 X_1 - Z_1\|_F^2 +$$
$$\|T_2 X_2 - Z_2\|_F^2 + \ldots + \|T_n X_n - Z_n\|_F^2 + \lambda_1 (\|T_1\|_F^2 - \log\det T_1) +$$
$$\lambda_2 (\|T_2\|_F^2 - \log\det T_2) + \ldots + \lambda_n (\|T_n\|_F^2 - \log\det T_n) +$$
$$\gamma \left\| T^{(f)} \begin{bmatrix} Z_1 \\ Z_2 \\ \vdots \\ Z_n \end{bmatrix} - Z^{(f)} \right\|_F^2 + \lambda (\|T^{(f)}\|_F^2 - \log\det T^{(f)}) + \alpha \|y - w Z^{(f)}\|_2^2$$

and wherein $T_1 \in \mathbb{R}^{K_1 \times m_1}, T_2 \in \mathbb{R}^{K_2 \times m_2}, T_n \in \mathbb{R}^{K_n \times m_n}$ are the sensor specific transforms, $T^{(f)} \in \mathbb{R}^{K \times (K_1 + K_2 + \ldots K_n)}$ is the fusing transform, $Z_1 \in \mathbb{R}^{K_1 \times N}, Z_2 \in \mathbb{R}^{K_2 \times N}, Z_n \in \mathbb{R}^{K_n \times N}$ are the sensor specific coefficients, $Z^{(f)} \in \mathbb{R}^{K \times N}$ is the fusing coefficient and $w \in \mathbb{R}^{1 \times K}$ is the weight matrix provided the training output $y \in \mathbb{R}^{1 \times N}$ K being the size of the sensor specific transforms and the fusing transform and N being the number of measurements in the training data.

3. The processor implemented method of claim 1, wherein the learning of each of the sensor specific transforms ($T_1, T_2, \ldots T_n$) is represented as $$T_j \leftarrow \min_{T_j} \|T_j X_j - Z_j\|_F^2 + \lambda_j (\|T_j\|_F^2 - \log\det T_j) \text{ for } j = 1, \ldots, n.$$

4. The processor implemented method of claim 1, wherein the learning of each of the sensor specific coefficients ($Z_1, Z_2, \ldots Z_n$) is represented as $$Z_j = (\gamma T_j^{(f)T} T_j^{(f)} + 1)^{-1} \cdot (T_j X_j + \gamma (T_j^{(f)T} (Z^{(f)} - \Sigma_{i=1, i \neq j}^n T_i^{(f)} Z_i)))$$
for $j = 1, \ldots, n$.

5. The processor implemented method of claim 1, wherein the learning of the fusing coefficient $Z^{(f)}$ is represented as $$Z^{(f)} = (I + \alpha w^T w)^{-1} \cdot (T^{(f)} Z' + \alpha w^T y), \text{ wherein } Z' = \begin{bmatrix} Z_1 \\ Z_2 \\ \vdots \\ Z_n \end{bmatrix}.$$

6. The processor implemented method of claim 1, wherein the learning of the weight matrix (w) is represented as $$w \leftarrow \min_{w} \alpha \|y - w Z^{(f)}\|_2^2.$$

7. The processor implemented method of claim 1, wherein the plurality of training data ($X_1, X_2, \ldots X_n$) and the plurality of new data ($x_1, x_2, \ldots x_n$) are kernelized using a kernel function.

8. The processor implemented method of claim 1, wherein estimating the sensor specific coefficients ($z_1, z_2, \ldots z_n$) corresponding to the plurality of new data ($x_1, x_2, \ldots x_n$) is represented as $$z_j = T_j x_j, \text{ for } j = 1, \ldots, n.$$

9. The processor implemented method of claim 1, wherein estimating the new fusing coefficient $z^{(f)}$ is represented as $$z^{(f)} = T^{(f)} \begin{bmatrix} z_1 \\ z_2 \\ \vdots \\ z_n \end{bmatrix}.$$

10. The processor implemented method of claim 1, wherein estimating the output ($y_{new}$) for the monitored system is represented as $$y_{new} = w z^{(f)}.$$

11. A system for multi-sensor fusion comprising:
a memory storing instructions;
one or more communication interfaces; and
one or more hardware processors coupled to the memory via the one or more communication interfaces, wherein the one or more hardware processors are configured by the instructions to:
receive a plurality of training data ($X_1, X_2, \ldots X_n$) from a plurality of sensors connected to a monitored system with a training output (y);
perform a joint optimization of a set of parameters including (i) sensor specific transforms ($T_1, T_2, \ldots T_n$) and (ii) sensor specific coefficients ($Z_1, Z_2, \ldots Z_n$), wherein each of the sensor specific transforms and the sensor specific coefficients correspond to a training data in the plurality of training data ($X_1, X_2, \ldots X_n$), (iii) a fusing transform ($T^{(f)}$), (iv) a fusing coefficient ($Z^{(f)}$), and (v) a weight matrix (w), and wherein the joint optimization comprises:

initializing the sensor specific transforms ($T_1$, $T_2$, ... $T_n$) and the fusing transform ($T^{(f)}$) with a random matrix comprising real numbers between 0 and 1;

estimating the sensor specific coefficients ($Z_1$, $Z_2$, ... $Z_n$) based on the initialized sensor specific transforms ($T_1$, $T_2$, ... $T_n$) and a corresponding training data from the plurality of training data ($X_1$, $X_2$, ... $X_n$);

estimating the fusing coefficient ($Z^{(f)}$) based on the initialized fusing transform ($T^{(f)}$) and the estimated sensor specific coefficients ($Z_1$, $Z_2$, ... $Z_n$);

estimating the weight matrix (w) based on the training output (y) and the estimated fusing coefficient ($Z^{(f)}$); and iteratively performing joint learning using the initialized parameters and the estimated parameters from the set of parameters in a first iteration and learnt parameters thereafter until a termination criterion is met, the joint learning comprising:

learning each of the sensor specific transforms ($T_1$, $T_2$, ... $T_n$) based on a corresponding sensor specific coefficient ($Z_1$, $Z_2$, ... $Z_n$) and the plurality of training data ($X_1$, $X_2$, ... $X_n$);

learning each of the sensor specific coefficients ($Z_1$, $Z_2$, ... $Z_n$) based on the fusing transform ($T^{(f)}$), a corresponding sensor specific transform ($T_1$, $T_2$, ... $T_n$), the fusing coefficient ($Z^{(f)}$) and a corresponding training data from the plurality of training data ($X_1$, $X_2$, ... $X_n$), and remaining of the sensor specific coefficients ($Z_1$, $Z_2$, ... $Z_n$);

learning the fusing transform ($T^{(f)}$) based on the sensor specific coefficient ($Z_1$, $Z_2$, ... $Z_n$) and the fusing coefficient ($Z^{(f)}$);

learning the fusing coefficient ($Z^{(f)}$) based on the fusing transform ($T^{(f)}$), the sensor specific coefficient ($Z_1$, $Z_2$, ... $Z_n$), the weight matrix (w) and the training output (y); and learning the weight matrix (w) based on the fusing coefficient ($Z^{(f)}$) and the training output (y);

wherein the termination criterion is one of (i) completion of a predefined number of iterations (Maxiter) and (ii) difference of the fusing transform ($T^{(f)}$) of a current iteration and the fusing transform ($T^{(f)}$) of a previous iteration being less than an empirically determined threshold value (Tol);

to obtain jointly (i) the learnt sensor specific transforms ($T_1$, $T_2$, ... $T_n$), (ii) the learnt fusing transform ($T^{(f)}$) and (iii) the learnt weight matrix (w) for the monitored system being sensed by the plurality of sensors; and estimate, an output ($y_{new}$) of the monitored system for a plurality of new data ($x_1$, $x_2$, ... $x_n$), wherein the new data is a time series data and estimating the output represents application of the method to the monitored system using the new data which is different from the training data ($X_1$, $X_2$, ... $X_n$), wherein the monitored system is a Friction Stir Welding (FSW) machine, wherein the output (y) is a value representing an Ultimate Tensile Strength (UTS) indicative of the quality of the weld performed by the FSW machine, wherein the step of estimating the output ($y_{new}$) of the FSW machine comprises:

receiving the plurality of new data ($x_1$, $x_2$, ... $x_n$) from the plurality of sensors connected to the FSW machine, wherein the sensors measure parameters pertaining to a force, a torque, and a power for a welding process implemented in real-time;

estimating the sensor specific coefficients ($z_1$, $z_2$, ... $z_n$) corresponding to the plurality of new data ($x_1$, $x_2$, ... $x_n$) using the received plurality of new data ($x_1$, $x_2$, ... $x_n$) and the learnt sensor specific transforms ($T_1$, $T_2$, ... $T_n$), wherein the sensor specific transforms are learnt to represent corresponding sensor data;

estimating a new fusing coefficient $z^{(f)}$ using the learnt fusing transform ($T^{(f)}$ and the estimated sensor specific coefficients ($z_1$, $z_1$, ... $z_n$); and estimating the output ($y_{new}$) for the FSW machine based on the learnt weight matrix (w) and the estimated new fusing coefficient $z^{(f)}$.

12. The system for multi-sensor fusion of claim 11, wherein the joint optimization is represented as $$\min_{T_1 T_2, \ldots, T_n, T^{(f)} Z_1, Z_2, \ldots, Z_n, Z^{(f)}, w} \|T_1 X_1 - Z_1\|_F^2 +$$
$$\|T_2 X_2 - Z_2\|_F^2 + \ldots + \|T_n X_n - Z_n\|_F^2 + \lambda_1 \left(\|T_1\|_F^2 - \log\det T_1\right) +$$
$$\lambda_2 \left(\|T_2\|_F^2 - \log\det T_2\right) + \ldots + \lambda_n \left(\|T_n\|_F^2 - \log\det T_n\right) +$$
$$\gamma \left\| T^{(f)} \begin{bmatrix} Z_1 \\ Z_2 \\ \vdots \\ Z_n \end{bmatrix} - Z^{(f)} \right\|_F^2 + \lambda \left(\|T^{(f)}\|_F^2 - \log\det T^{(f)}\right) + \alpha \|y - w Z^{(f)}\|_2^2,$$

and wherein $T_1 \in \mathbb{R}^{K_1 \times m_1}$, $T_2 \in \mathbb{R}^{K_2 \times m_2}$, $T_n \in \mathbb{R}^{K_n \times m_n}$ are the sensor specific transforms, $T^{(f)} \in \mathbb{R}^{K \times (K_1 + K_2 + \ldots K_n)}$ is the fusing transform, $Z_1 \in \mathbb{R}^{K_1 \times N}$, $Z_2 \in \mathbb{R}^{K_2 \times N}$, $Z_n \in \mathbb{R}^{K_n \times N}$ are the sensor specific coefficients, $Z^{(f)} \in \mathbb{R}^{K \times N}$ is the fusing coefficient and $w \in \mathbb{R}^{1 \times K}$ is the weight matrix provided the training output $y \in \mathbb{R}^{1 \times N}$, K being the size of the sensor specific transforms and the fusing transform and N being the number of measurements in the training data.

13. The system for multi-sensor fusion of claim 11, wherein (i) the learning of each of the sensor specific transforms ($T_1$, $T_2$, ... $T_n$) is represented as $$T_j \leftarrow \min_{T_j} \|T_j X_j - Z_j\|_F^2 + \lambda_j \left(\|T_j\|_F^2 - \log\det T_j\right)$$

for j=1, ..., n, (ii) the learning of each of the sensor specific coefficients ($Z_1$, $Z_2$, ... $Z_n$) is represented as $$Z_j = (\gamma T_j^{(f)^T} T_j^{(f)} + 1)^{-1} \cdot (T_j X_j + \gamma (T_j^{(f)^T} (Z^{(f)} - \Sigma_{i=1, i \neq j}^n T_j^{(f)} Z_i)))$$
for j=1, ..., n, (iii) the learning of the fusing coefficient $Z^{(f)}$ is represented as $Z^{(f)} = (I + \alpha w^T w)^{-1} \cdot (T^{(f)} Z' + \alpha w^T y)$, wherein $$Z' = \begin{bmatrix} Z_1 \\ Z_2 \\ \vdots \\ Z_n \end{bmatrix},$$

and (iv) the learning of the weight matrix (w) is represented as $$w \leftarrow \min_{w} \alpha \|y - wZ^{(f)}\|_2^2.$$

14. The system for multi-sensor fusion of claim 11, wherein the plurality of training data $(X_1, X_2, \ldots X_n)$ and the plurality of new data $(x_1, x_2, \ldots x_n)$ are kernelized using a kernel function.

15. The system for multi-sensor fusion of claim 11, wherein estimating the sensor specific coefficients $(z_1, z_2, \ldots z_n)$ corresponding to the plurality of new data $(x_1, x_2, \ldots x_n)$ is represented as $z_j = T_j x_j$, for $j=1, \ldots, n$, wherein estimating the new fusing coefficient $z^{(f)}$ is represented as $$z^{(f)} = T^{(f)} \begin{bmatrix} z_1 \\ z_2 \\ \vdots \\ z_n \end{bmatrix},$$

and wherein estimating the output $(y_{new})$ for the monitored system is represented as $y_{new} = wz^{(f)}$.

16. A computer program product comprising a non-transitory computer readable medium having a computer readable program embodied therein, wherein the computer readable program, when executed on a computing device, causes the computing device to:
receive, via one or more hardware processors, a plurality of training data $(X_1, X_2, \ldots X_n)$ from a plurality of sensors connected to a monitored system with a training output (y);
perform, via the one or more hardware processors, a joint optimization of a set of parameters including (i) sensor specific transforms $(T_1, T_2, \ldots T_n)$ and (ii) sensor specific coefficients $(Z_1, Z_2, \ldots Z_n)$, wherein each of the sensor specific transforms and the sensor specific coefficients correspond to a training data in the plurality of training data $(X_1, X_2, \ldots X_n)$, (iii) a fusing transform $(T^{(f)})$, (iv) a fusing coefficient $(Z^{(f)})$, and (v) a weight matrix (w), and wherein the joint optimization comprises:
initialize the sensor specific transforms $(T_1, T_2, \ldots T_n)$ and the fusing transform $(T^{(f)})$ with a random matrix comprising real numbers between 0 and 1;
estimate the sensor specific coefficients $(Z_1, Z_2, \ldots Z_n)$ based on the initialized sensor specific transforms $(T_1, T_2, \ldots T_n)$ and a corresponding training data from the plurality of training data $(X_1, X_2, \ldots X_n)$;
estimate the fusing coefficient $(Z^{(f)})$ based on the initialized fusing transform $(T^{(f)})$ and the estimated sensor specific coefficients $(Z_1, Z_2, \ldots Z_n)$;
estimate the weight matrix (w) based on the training output (y) and the estimated fusing coefficient $(Z^{(f)})$; and
iteratively perform joint learning using the initialized parameters and the estimated parameters from the set of parameters, in a first iteration and learnt parameters thereafter until a termination criterion is met, the joint learning comprising:
learning each of the sensor specific transforms $(T_1, T_2, \ldots T_n)$ based on a corresponding sensor specific coefficient $(Z_1, Z_2, \ldots Z_n)$ and the plurality of training data $(X_1, X_2, \ldots X_n)$;
learning each of the sensor specific coefficients $(Z_1, Z_2, \ldots Z_n)$ based on the fusing transform $(T^{(f)})$, a corresponding sensor specific transform $(T_1, T_2, \ldots T_n)$, the fusing coefficient $(Z^{(f)})$ and a corresponding training data from the plurality of training data $(X_1, X_2, \ldots X_n)$, and remaining of the sensor specific coefficients $(Z_1, Z_2, \ldots Z_n)$;
learning the fusing transform $(T^{(f)})$ based on the sensor specific coefficient $(Z_1, Z_2, \ldots Z_n)$ and the fusing coefficient $(Z^{(f)})$;
learning the fusing coefficient $(Z^{(f)})$ based on the fusing transform $(T^{(f)})$, the sensor specific coefficient $(Z_1, Z_2, \ldots Z_n)$, the weight matrix (w) and the training output (y); and
learning the weight matrix (w) based on the fusing coefficient $(Z^{(f)})$ and the training output (y);
wherein the termination criterion is one of (i) completion of a predefined number of iterations (Maxiter) and (ii) difference of the fusing transform $(T^{(f)})$ of a current iteration and the fusing transform $(T^{(f)})$ of a previous iteration being less than an empirically determined threshold value (Tol);
to obtain jointly (i) the learnt sensor specific transforms $(T_1, T_2, \ldots T_n)$, (ii) the learnt fusing transform $(T^{(f)})$ and (iii) the learnt weight matrix (w) for the monitored system being sensed by the plurality of sensors; and
estimating, via the one or more hardware processors, an output $(y_{new})$ of the monitored system for a plurality of new data $(x_1, x_2, \ldots x_n)$, wherein the new data is a time series data and estimating the output represents application of the method to the monitored system using the new data which is different from the training data $(X_1, X_2, \ldots X_n)$, wherein the monitored system is a Friction Stir Welding (FSW) machine, wherein the output (y) is a value representing an Ultimate Tensile Strength (UTS) indicative of the quality of the weld performed by the FSW machine, wherein the step of estimating the output $(y_{new})$ of the FSW machine comprises:
receiving the plurality of new data $(x_1, x_2, \ldots x_n)$ from the plurality of sensors connected to the FSW machine, wherein the sensors measure parameters pertaining to a force, a torque, and a power for a welding process implemented in real-time;
estimating the sensor specific coefficients $(z_1, z_2, \ldots z_n)$ corresponding to the plurality of new data $(x_1, x_2, \ldots x_n)$ using the received plurality of new data $(x_1, x_2, \ldots x_n)$ and the learnt sensor specific transforms $(T_1, T_2, \ldots T_n)$ wherein the sensor specific transforms are learnt to represent corresponding sensor data;
estimating a new fusing coefficient $z^{(f)}$ using the learnt fusing transform $(T^{(f)}$ and the estimated sensor specific coefficients $(z_1, z_2, \ldots z_n)$; and
estimating the output $(y_{new})$ for the FSW machine based on the learnt weight matrix (w) and the estimated new fusing coefficient $z^{(f)}$.

\* \* \* \* \*